(12) United States Patent
Altman et al.

(10) Patent No.: US 9,810,784 B2
(45) Date of Patent: Nov. 7, 2017

(54) SYSTEM AND METHOD FOR OBJECT POSITION ESTIMATION BASED ON ULTRASONIC REFLECTED SIGNALS

(75) Inventors: Nathan Altman, RaAnana (IL); Yossef Tsfaty, Rishon-LeZion (IL); Meir Agassy, Ramat-Gan (IL)

(73) Assignee: QUALCOMM Incorporated, San Diego, CA (US)

( * ) Notice: Subject to any disclaimer, the term of this patent is extended or adjusted under 35 U.S.C. 154(b) by 1211 days.

(21) Appl. No.: 13/885,677

(22) PCT Filed: Nov. 16, 2011

(86) PCT No.: PCT/IL2011/000884
§ 371 (c)(1),
(2), (4) Date: Jul. 19, 2013

(87) PCT Pub. No.: WO2012/066541
PCT Pub. Date: May 24, 2012

(65) Prior Publication Data
US 2013/0301391 A1    Nov. 14, 2013

Related U.S. Application Data

(60) Provisional application No. 61/414,004, filed on Nov. 16, 2010.

(51) Int. Cl.
*G01S 15/00* (2006.01)
*G01S 15/08* (2006.01)
(Continued)

(52) U.S. Cl.
CPC ............ *G01S 15/08* (2013.01); *G01S 13/003* (2013.01); *G01S 13/32* (2013.01); *G01S 15/003* (2013.01); *G01S 15/32* (2013.01)

(58) Field of Classification Search
CPC ........ G01S 13/003; G01S 13/32; G01S 15/08; G01S 15/32; G01S 15/003
(Continued)

(56) References Cited

U.S. PATENT DOCUMENTS 4,159,462 A * 6/1979 Rocha ................. G01S 7/52026
367/105
5,128,961 A * 7/1992 Ueda ........................ G01S 5/22
342/458
(Continued)

FOREIGN PATENT DOCUMENTS

CN        1942782 A       4/2007
CN     101594164 A      12/2009
(Continued)

OTHER PUBLICATIONS

European Search Report—EP15151597—Search Authority—The Hague—dated Jun. 23, 2015.
(Continued)

*Primary Examiner* — Mark Hellner
(74) *Attorney, Agent, or Firm* — Haynes and Boone, LLP

(57) ABSTRACT

A system for small space positioning comprises a transmitting element at a fixed and known location, which transmitting a modulated continuous wave, for example an ultrasonic wave, having a continuous carrier signal part and a base-band signal modulated thereon. The transmitting element transmits the modulated continuous wave over a range in which an object to be positioned may appear. A receiving element receives signals transmitted by the transmitting device and reflected by the object, and a position detection element determines a position of the object from analysis of both the carrier signal part and the base-band signal received from the reflected signal.

45 Claims, 15 Drawing Sheets

(51) Int. Cl.
*G01S 13/00* (2006.01)
*G01S 13/32* (2006.01)
*G01S 15/32* (2006.01)

(58) Field of Classification Search
USPC .................................................. 367/100
See application file for complete search history.

(56) References Cited

U.S. PATENT DOCUMENTS

| | | |
|---|---|---|
| 6,492,938 B1 | 12/2002 | Alland |
| 7,711,329 B2 | 5/2010 | Aparin et al. |
| 7,852,318 B2 | 12/2010 | Altman |
| 8,036,623 B2 | 10/2011 | Chang et al. |
| 8,184,504 B2 | 5/2012 | Altman et al. |
| 2005/0150697 A1 | 7/2005 | Altman et al. |
| 2007/0121097 A1 | 5/2007 | Boillot et al. |
| 2008/0005703 A1 | 1/2008 | Radivojevic et al. |
| 2010/0085838 A1* | 4/2010 | Altman .................. G01S 5/021 367/124 |
| 2010/0296368 A1 | 11/2010 | Dahl et al. |

FOREIGN PATENT DOCUMENTS

| | | |
|---|---|---|
| CN | 101636916 A | 1/2010 |
| CN | 101730851 A | 6/2010 |
| CN | 101951241 A | 1/2011 |
| DE | 10027828 A1 | 12/2001 |
| EP | 0430148 A2 | 6/1991 |
| JP | S63233336 A | 9/1988 |
| JP | H03165287 A | 7/1991 |
| JP | H03264833 A | 11/1991 |
| JP | 2000267798 A | 9/2000 |
| JP | 2002143160 A | 5/2002 |
| JP | 2002244814 A | 8/2002 |
| JP | 2002531816 A | 9/2002 |
| JP | 2005141542 A | 6/2005 |
| JP | 2005522708 A | 7/2005 |
| JP | 2007024715 A | 2/2007 |
| JP | 2008524623 A | 7/2008 |
| JP | 2009244268 A | 10/2009 |
| JP | 2010522879 A | 7/2010 |
| JP | 2011237360 A | 11/2011 |
| WO | 0033021 A1 | 6/2000 |
| WO | 03088136 A2 | 10/2003 |
| WO | 2005103758 A1 | 11/2005 |
| WO | 2005111653 A2 | 11/2005 |
| WO | 2006/068635 A1 | 6/2006 |
| WO | 2006067436 A1 | 6/2006 |
| WO | 2008/112800 A2 | 9/2008 |
| WO | 2008117292 A2 | 10/2008 |

OTHER PUBLICATIONS

International Preliminary Report on Patentability—PCT/IL2011/000884, The International Bureau of WIPO—Geneva, Switzerland, dated Apr. 29, 2013.

Chan, et al., "A non-linear phase-only algorithm for active sonar signal processing," MTS/IEEE Conference Proceedings OCEANS '97, vol. 1, pp. 506-511.

Hayes, "Ultrasonic Imaging in Air with a Broadband Inverse Synthetic Aperture Sonar," Imaging and Sensing Team, Industrial Research Limited, New Zealand, 1997, 6 pages.

International Search Report—PCT/IL2011/000884—ISA/EPO—dated May 9, 2012.

Klahold, et al., "Continuous Sonar Sensing for Mobile Mini-Robots," IEEE International Conference on Robotics and Automation, 2002. Proceedings. ICRA '02, vol. 1, pp. 323-328.

Nielsen, "Cramer-Rao lower bounds for sonar broad-band modulation parameters," IEEE Journal of Oceanic Engineering, Jul. 1999, vol. 24, No. 3, pp. 285-290.

* cited by examiner

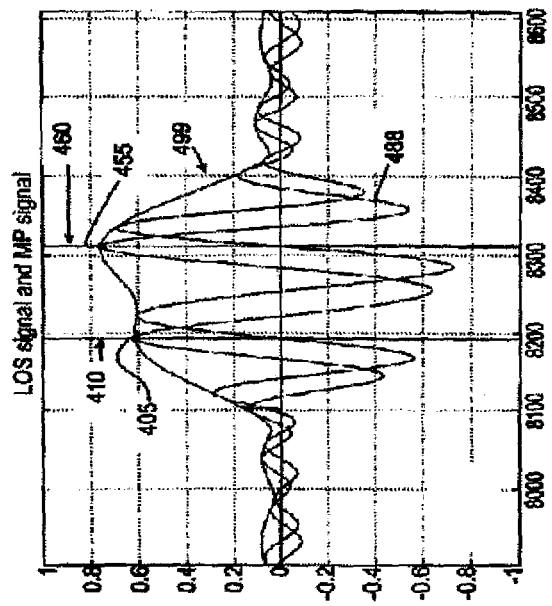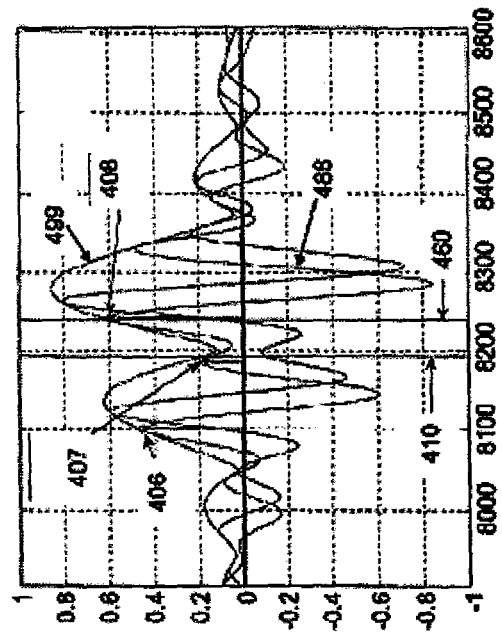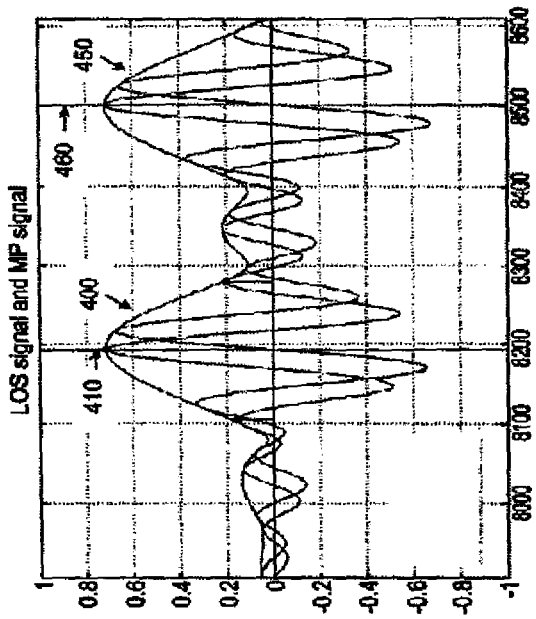

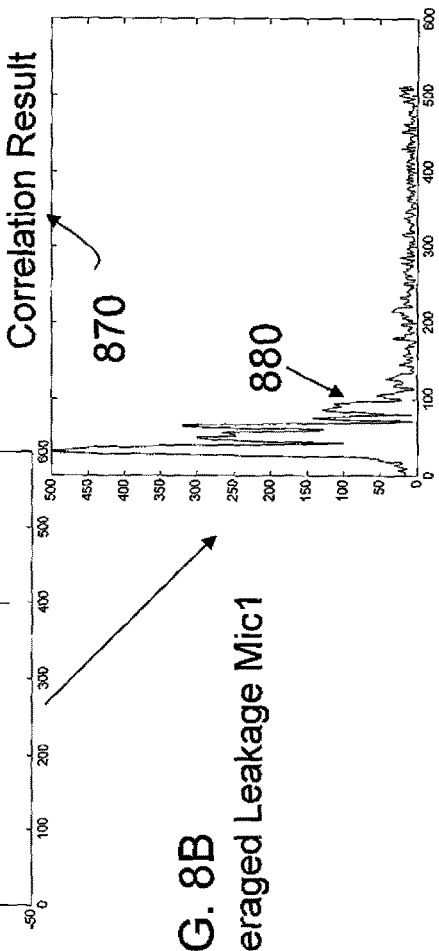
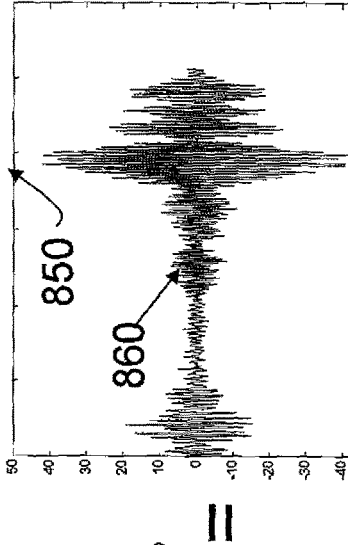
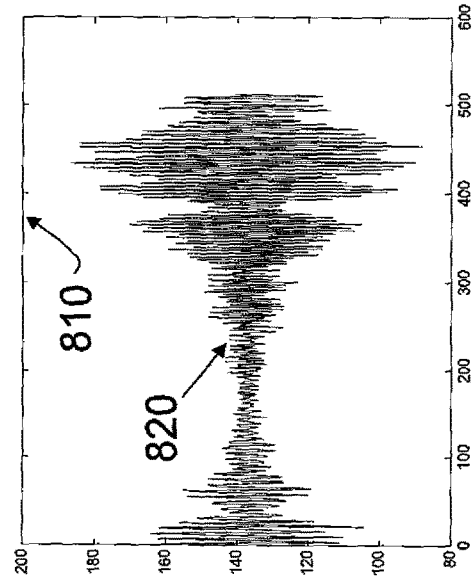
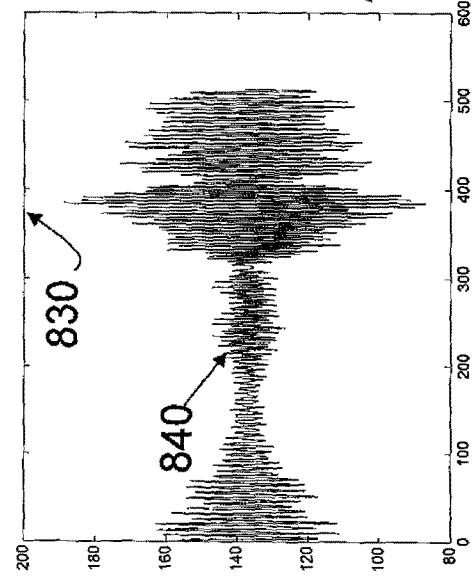

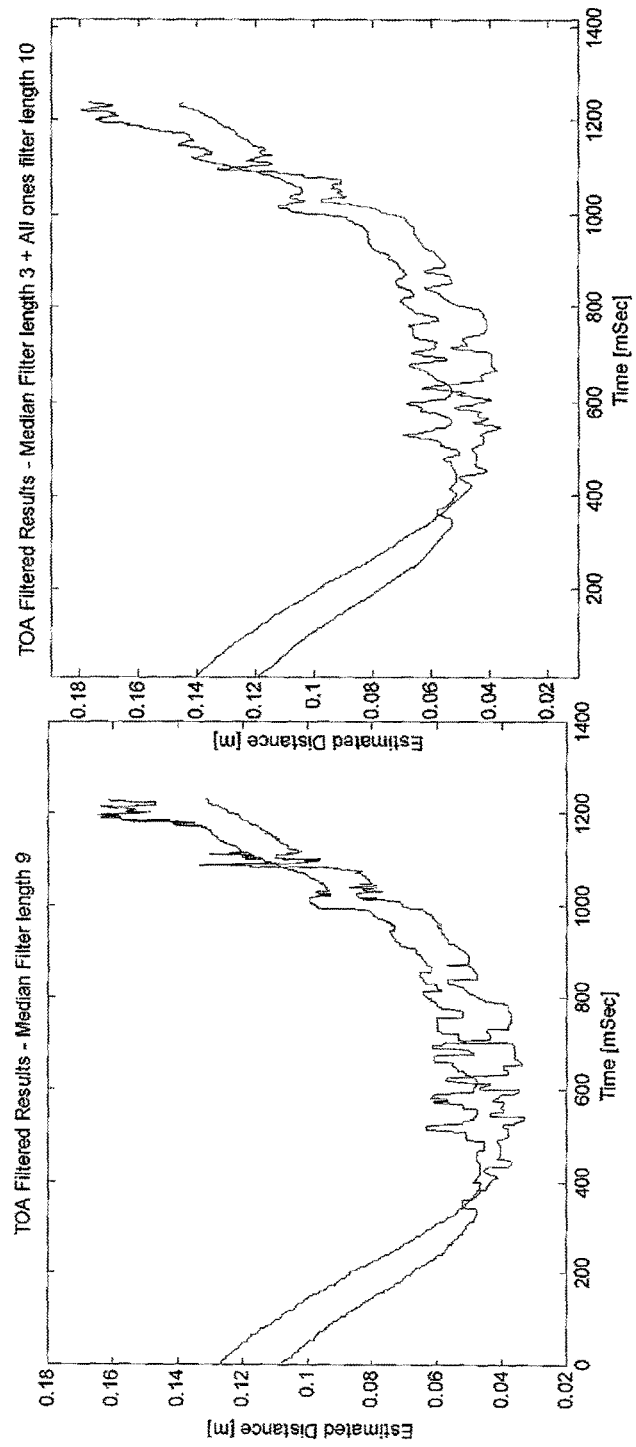

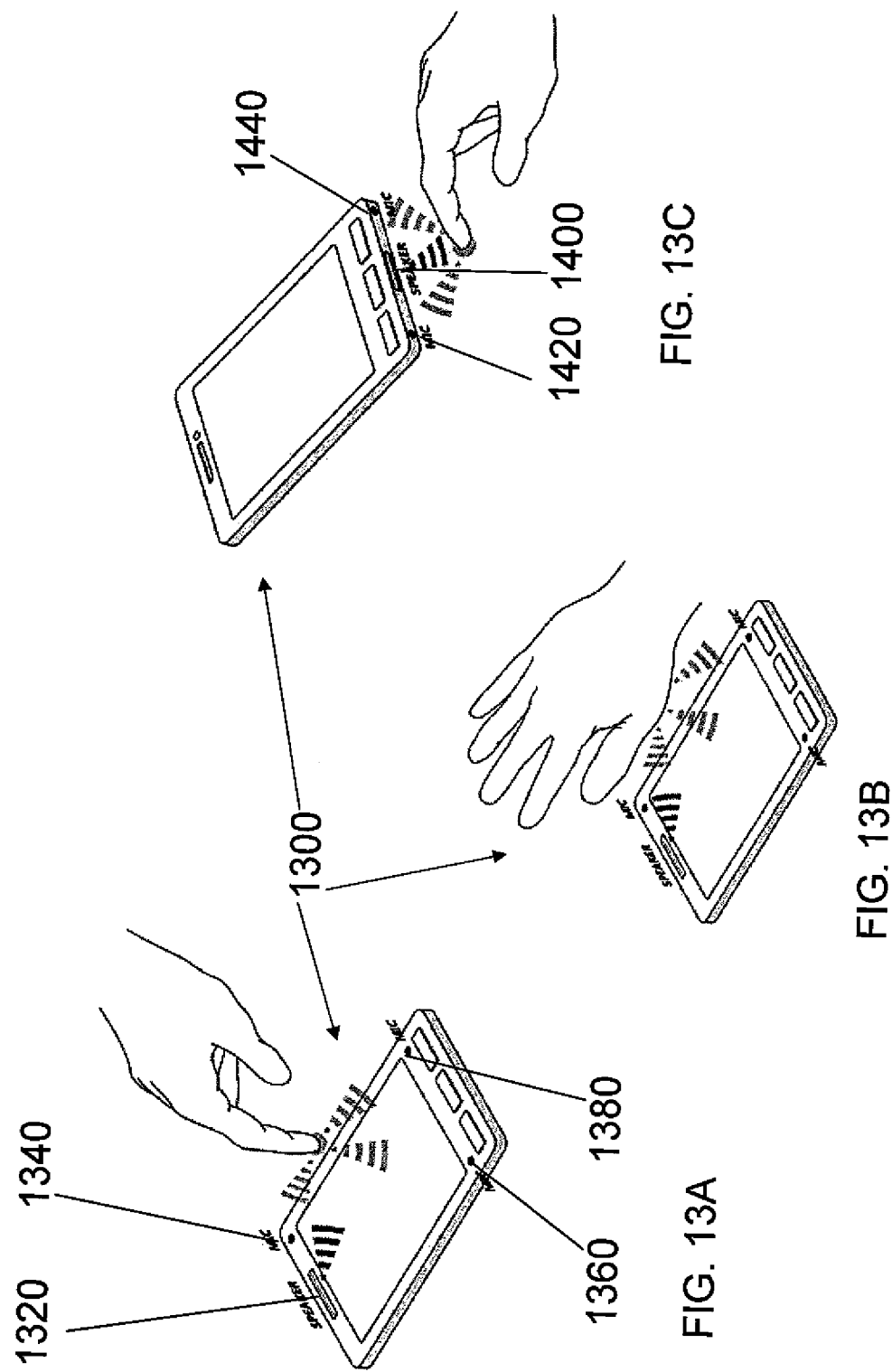

SYSTEM AND METHOD FOR OBJECT POSITION ESTIMATION BASED ON ULTRASONIC REFLECTED SIGNALS

FIELD OF THE INVENTION

The present invention in some embodiments thereof, relates to positioning systems and methods, and more particularly, but not exclusively to small space positioning systems and methods.

BACKGROUND OF THE INVENTION

The field of small space positioning, positioning within spaces of a few meters or less, is known. Known applications utilizing small space positioning systems include applications with pointing devices for computer interaction, robotics and machine control systems, as well as computer interaction systems for toys and inventory control. Certain applications may require 2D solutions, others may require 3D solutions. Certain applications such as pointing devices may require only one-way communication, whereas others, e.g. robotic applications, may require two-way communication.

Object positioning by usage of range finding with directional transmitter/receiver is also well known using ultrasonic reflection in a method called SONAR (sound navigation and ranging). This method works similarly to RADAR (radio detection and ranging): An ultrasonic pulse is generated in a particular direction. If there is an object in the path of this pulse, part or all of the pulse will be reflected back to the transmitter as an echo and can be detected through the receiver path. By measuring the difference in time between the pulse being transmitted and the echo being received, it is possible to determine how far away the object is.

International Patent Application Publication No. WO2005111653, entitled "Acoustic Robust Synchronization Signaling For Acoustic Positioning System", assigned to Epos Technologies Ltd; Altman Nathan, the contents of which are hereby incorporated by reference, describes positional element and positioning device, wherein the positional element transmits a continuously modulated acoustic waveform and a synchronization signal that is a sequence of at least two synchronization packets, each bearing timing data for the continuously modulated acoustic waveform. Additionally, the synchronization signal uses time hopping to support concurrent positioning of a plurality of positional elements.

International Patent Application Publication No. WO03088136, entitled "Method And System For Obtaining Positioning Data", assigned to Epos Technologies Ltd; Altman Nathan and Eliashiv Oded, the contents of which are hereby incorporated by reference, describes a positional element for attaining a position and including a first emitter for emitting a substantially continuous ultrasonic waveform decodable to fix the position, and a detector arrangement for detecting the waveform in a manner permitting fixing of the position and outputting the waveform for computation, in a manner retentive of the position fixing ability.

International Patent Application Publication No. WO2008117292, entitled "System And Method For Positioning", assigned to Epos Technologies Ltd; Altman Nathan and Agassy Meir, the contents of which are hereby incorporated by reference, describes the usage base-band and carrier information for providing improved accuracy and/or reduced ambiguity over known systems.

"Ultrasonic Imaging in Air with a Broadband Inverse Synthetic Aperture Sonar", Michael P. Hayes, 1997 discusses analysis of received ultrasonic reflections from digitally modulated ultrasonic signal. It lacks the technique of BB and carrier analysis, channel modeling, leakage estimation and orthogonal signals.

US2007/0121097 discusses gesture analysis using shaped ultrasonic pulse. However, the described technique uses only real signals, it does not disclose orthogonal BB signals as well as leakage estimation.

US patent application 20080005703 discloses hand gesture recognition using ultrasound. However, it does not disclose modulation techniques.

US patent application 20100296368 discloses echo analysis for gesture detection. However, it does not disclose modulation techniques neither to usage of BB and carrier information.

"Continuous Sonar Sensing for Mobile Mini Robots", Jurgen Kalhold et al, 2002, discloses using continuous modulated transmission. However, it does not disclose usage of BB and carrier information. The discussion of orthogonal coding is for vehicles separation and for estimating the same target from several transmitters simultaneously.

SUMMARY OF THE INVENTION

According to an aspect of some embodiments of the present invention there is provided a system and method for small space positioning, which may improve accuracy and/or reduce ambiguity over known systems. Echoes may be obtained from a passive object to be positioned, of a continuous modulated acoustic wave having a carrier signal and a modulation.

An aspect of some embodiments of the present invention is the provision of a system for small space positioning comprising a transmitting device, that transmits a modulated continuous wave, wherein the modulated continuous wave includes a carrier signal and a base-band signal that transmits the signal towards an area or space or range within which an object it is desired to track may appear. A receiving unit receives signal(s) reflected from that object which were originated at the transmitting device. The received signal may include leakage of the direct path from the transmitter device. The system may determine the position of the object that reflects the transmission using an approximate range-based analysis that uses both the carrier signal and the base-band signal received by the round-trip-delay of the transmission and reflected to/from the object.

The system may use voice components as provided in a given computing device, such as built-in stereo microphones and speakers, in order to transmit and receive the ultrasonic signals.

The analysis of both the carrier signal and the base-band signal may include phase analysis of the carrier signal.

The receiving unit may include a detector, for performing correlation between a modulated continuous wave received by the receiving unit and an expected modulated continuous wave.

Optionally, the modulated continuous wave has a predetermined form or structure, and the expected modulated continuous wave is a replica of the modulated continuous wave transmitted by the transmitting device.

Optionally, the expected continuous wave models the overall response of the transmitted wave including for example the modulated digital signal, transmitter, air, microphone and receiving circuitry.

Optionally, the expected continuous wave is derived from a recording of a reflection.

Optionally, the receiving unit determines a base-band and carrier signal correlation curves from the correlation between the received modulated continuous wave and the expected modulated continuous wave.

Optionally, the receiving unit includes leakage attenuation mechanism, where leakage is defined as the signal received from the fixed transmitted in the direct path (transmitter to receiver), where as the reflected signal is the one desired for TOA measurement. Leakage can be defined also in a broader view, which may include, apart from the direct path signal, also the signals reflected from a the static environment: device case, artifacts located near the device, the surface on which the device is placed etc. A good leakage attenuation mechanism may estimate the reflections from the environment which have relatively lower change rate than the target. This way the target's motion will be easier to detect and track. An example for leakage signal is the signal arriving in the shortest path from the speaker to the microphone(s) of a mobile device.

Optionally, the leakage attenuation method includes a method in which the received signal undergoes a differential operation, to remove the constant leakage, and then complex correlation is carried out with the expected waveform of the received signal.

Leakage is the received acoustic signal sent from the transmitter (speaker) when there are no reflectors. For example when a surface is used, say a handset is placed on a table, the leakage may include reflection from the surface.

The word "speaker" relates herein to any acoustic emitting device.

Optionally, a leakage attenuation method uses knowledge of a condition in which no object is present (i.e.: no reflection present), and then a correlation is calculated and a value of the correlation is averaged for a few frames. A frame may be defined as the duration of a sequence, from which the continuous modulation is built up. The result is stored in the memory. Upon indication of the possible presence of an object to be positioned, a correlation is calculated and the vector of saved values of the correlation from the no object present condition is subtracted from the correlation value. This results in a leakage free correlation signal.

As a further alternative, the leakage attenuation method uses a knowledge of no object to be positioned (i.e.: no reflection present), and then the time-domain signal received from the direct-path is averaged and stored. Upon knowledge of possible existence of an object, the time-domain samples are subtracted from the pattern previously stored, yielding a leakage free time domain signal, which may then be further correlated with the continuous wave in order to find the time of arrival, TOA.

Since the leakage is typically constant, leakage compensation can be used as a means of distance calibration. Thus it is possible to measure the TOA of the leakage, using the known-distance from the microphones to the speaker to calculate the speed of sound. The speed of sound can be used to calculate the ambient temperature.

Optionally, the receiving element determines one or more peaks in the absolute correlation curve and one or more peaks in the real correlation curve. The mathematical definition for real correlation and absolute correlation curves are provided hereinbelow.

Optionally, the receiving unit includes one or more receivers and the receiving unit is configured for determining a line of sight distance, or a primary reflection distance, between the transmitting device and the receiver.

Optionally, a peak in the absolute correlation curve substantially aligned with a peak in the real correlation curves corresponds to a most likely line of sight distance or primary reflection distance, between the receiver and the transmitting device.

Optionally, the system comprises an ambiguity resolver to select one or more peaks from multiple peaks in the real correlation curve.

Optionally, the multiple peaks are obtained from a received signal including several delayed signals whose correlation curves super-impose on each other.

Optionally, the system comprises an ambiguity resolver, which identifies one of a number of peaks that is closest to the peak of the absolute correlation curve or to decide that there is no suitable peak.

Optionally, a score is used that is based on values of one or more pre-defined parameters calculated by the ambiguity resolver.

Optionally, the receiving unit deciphers the most likely line of sight distance (or most likely reflections distance) between the transmitter, (reflections), and the one or more receivers, wherein the signal received by the receiver includes several delayed signals in close range that superimpose on each other due to multi-pathing of the signal transmitted by the transmitting device.

Optionally, the receiving unit determines the position with an accuracy in the order of one tenth of the carrier signal wavelength.

Optionally, a different base-band signal is used for different systems.

Optionally, the receiving unit stores information regarding the base-band signal to be transmitted by the transmitting device and reflected by the object to be positioned.

Optionally, the receiving unit distinguishes between a modulated signal with a carrier frequency reflected from the object to be positioned where the reflection is for a transmitting device of the system and other transmitting devices based on the base-band signal.

Optionally, the receiving unit stores one or more calibration parameters for adjusting the expected modulated continuous wave based on a transfer function of the system.

Optionally, the calibration parameter is one of phase response, amplitude response, and group delay.

Optionally, the modulated continuous wave is an acoustic wave.

Optionally, the modulated continuous wave is an ultrasound wave.

Optionally, the modulated continuous wave is an ultrasound wave within the range of 1-18 MHz configured for penetrating through a media other than air.

Optionally, the modulated continuous wave is an RF wave.

Optionally, the frequency of the carrier signal is in the same order of magnitude as that of a base-band signal of the modulated continuous wave.

Optionally, the receiving unit comprises at least two receivers spaced apart and each positioned in pre-defined locations.

Optionally, the system comprises a processing unit configured to determine a position of the transmitting device based on triangulation of line of sight distances (or reflections distances) between the transmitting device (reflections) and each of two receivers.

Optionally, the transmitting device transmits a synchronization signal which defines the start of a time of flight delay.

Optionally, the synchronization signal is an IR signal.

Optionally, the synchronization signal is an RF signal.

An aspect of some embodiments of the present invention is the provision of a method for small space positioning comprising transmitting a modulated continuous wave from a transmitting device, wherein the modulated continuous wave includes a carrier signal and a base-band signal, and receiving signals transmitted by the transmitting device at receivers positioned at a predefined distance from each other; and determining a position of the transmitting device using an approximate range based analysis of both the carrier signal and the base-band signal received from the transmitting device, wherein one of the transmitting device and receivers is movable within an approximate range and the other is positioned at a predefined location.

An aspect of some embodiments of the present invention is the provision of a method for small space positioning comprising transmitting a modulated continuous wave from a transmitting device, wherein the modulated continuous wave includes a carrier signal and a base-band signal, and receiving signals transmitted by the transmitting device with receivers and transmitter positioned at a predefined distance from each other; and determining a position of the reflecting object using an approximate range based analysis of both the carrier signal and the base-band signal received from the transmitting and/or receiving device, wherein the reflecting object is movable within an approximate range.

Optionally, the transmitting device is movable within an approximate range and the receivers are positioned at predefined locations.

Optionally, the analysis of both the carrier signal and the base-band signal includes phase analysis of the carrier signal.

Optionally, the method comprises performing correlation between a modulated continuous wave received by the receiving unit and an expected modulated continuous wave.

Optionally, the modulated continuous wave is of predetermined form and the expected modulated continuous wave is a replica of the modulated continuous wave transmitted.

Optionally, the method comprises determining an absolute correlation curve and real correlation curve from the correlation between the received modulated continuous wave and the expected modulated continuous wave.

Optionally, the method comprises determining a peak in the absolute correlation curve and a peak in the real correlation curve.

Optionally, the method comprises determining a line of sight distance between the transmitting device and the at least one receiver.

Optionally, a peak in the absolute correlation curve substantially aligned with a peak in the real correlation curves corresponds to a most likely line of sight distance between the at least one receiver and the transmitting device.

Optionally, the method comprises selecting the peak from multiple peaks in the real correlation curve.

Optionally, the plurality of peaks is obtained from a received signal including several delayed signals whose correlation curves super-impose on each other.

Optionally, the method comprises identifying a peak from multiple peaks that is closest to the peak of the absolute cross-correlation curve.

Optionally, the method comprises identifying a peak from multiple peaks that is closest to a rising energy in the absolute correlation curve.

Optionally, the method comprises identifying a peak from multiple peaks based history tracking of determined line of sight distances.

Optionally, the method comprises identifying a peak from multiple peaks based on velocity tracking of determined line of sight distances over time.

Optionally, the method comprises comparing possible line of sight distances calculated from different receivers.

Optionally, the method comprises determining a minimum variance or a maximum likelihood of a superimposed wave fitting the received modulated continuous wave.

Optionally, the method comprises identifying a peak from multiple peaks based on a score assigned to at least a portion of the multiple peaks.

Optionally, the score is based on calculated values of one or more pre-defined parameters.

Optionally, the method comprises deciphering the most likely line of sight distance (or most likely reflections distance) between the transmitter, (reflectors) and a receiver, wherein the signal received by the receiver includes several delayed signals in close range that super-impose on each other due to multi-pathing of the signal transmitted by the transmitting device.

Optionally, the method comprises determining the position within accuracy in the order of one tenth of a wavelength of the carrier signal.

Optionally, the method comprises distinguishing between signals transmitted from different transmitting devices.

Optionally, the distinguishing is based on comparing an expected base-band signal with a received base-band signal.

Optionally, the method comprises adjusting a template of the expected modulated continuous wave on the fly.

Optionally, the adjusting is based on a quantitative measure for the quality of the modulated continuous wave received.

Optionally, the quantitative measure is a correlation score of the correlation between the modulated continuous wave and the expected modulated continuous wave.

Optionally, the TOA trajectory for each receiving unit is filtered using a time-domain filtering technique such as FIR, IIR or a non linear filter such as median filter or a combination of such techniques.

Optionally the shape of the TOA trajectory from all receiving units is used to identify an Up/Down or Down/Up movement of the object. This could be done by verifying that the TOA trajectory of all receivers is similar, or that a constant time shift exists throughout the entire trajectory. Then, the shape of the TOA trajectory is used to find an Up/Down if it is similar to an "L" shape. That is to say, at the beginning of the trajectory, the derivative of the TOA is negative and than has a constant value. Similarly, a Down/Up movement may be identified, if the shape of the TOA trajectory has a positive derivative at the beginning and ends with a zero derivative.

Optionally, a Left To Right or Right To Left movement may be extracted from the TOA trajectories of the received signals by identifying a "U" shape from both trajectories. Such a "U" shape may comprise a negative derivative at the beginning, followed by zero derivatives (on the average), ending with a period of a positive derivative.

Optionally, a Left To Right movement could be identified if the "U" shape of the trajectory of the first receiver comes before the "U" shape of the trajectory that results from the second receiver, in an example where the first receiver is closer to the right hand side of the system.

Optionally, the modulated continuous wave is an acoustic wave.

Optionally, the modulated continuous wave is an ultrasound wave.

Optionally, the modulated continuous wave is an ultrasound wave within the range of 1-18 MHz for penetrating through a media other than air.

Optionally, the modulated continuous wave is an RF wave.

Optionally, the frequency of the carrier signal is in the same order of magnitude as that of a base-band signal of the modulated continuous wave.

Optionally, the method comprises performing triangulation of line of sight distances between the transmitting device and each of two receivers for receiving the signals transmitted from the transmitting device.

Optionally, the method comprises transmitting a synchronization signal, wherein the synchronization signal defines the start of a time of flight delay.

Optionally, the synchronization signal is an IR signal.

Optionally, the synchronization signal is an RF signal.

Optionally, the exact position of the object reflecting the signals can be estimated by redundancy of microphones or speakers, for instance by using three microphones and one speaker, or two microphones and two speakers. The usage of signal encoding is specifically useful when using several speakers simultaneously, since each of the speakers can emit a different code, thus providing more information on the reflecting environment in a short time period.

Optionally, the same signal can be transmitted from several speakers, with controlled delay between the signals driving the speakers. This method allows beam steering of the transmitted signal. The beam can be controlled in order to receive reflections from a desired direction. Steering the beam allows the creation of a 3D image around the device.

Optionally, the position of the reflecting object can be obtained simultaneously with audio related activities, as music playing, voice calls etc.

Optionally, the same audio components are used both for ultrasound and for voice applications. The inventors found that some microphones, typically using MEMS technology, have an ultrasonic response that may be utilized, thus providing functionality without having to provide new components. Speakers and other audio emitters have residual response in the ultrasound range. Alternatively, the emitters can be dedicated ultrasonic devices while microphones will be used both for audio and ultrasound. Alternatively, vice versa approach can be used.

The usage of existing audio elements has some limitations, mainly due to a non-favorable frequency response in the ultrasonic range. Since these components are mainly made for voice applications, their ultrasonic frequency response will not be flat. Flatness has considerable benefits for TOA estimations: it allows narrower cross-correlation results and is more immune to multipath and noise. There are numerous techniques to flatten the frequency response, such as shaping the transmitted signal. On the receiver side, the received signal can pass an equalizer to shape the effective frequency response.

Overall, it is considered favorable to devices to use the same components both for audio and for ultrasound, thus saving the cost and complexity of adding additional components to the device.

Optionally, the reflecting object position can be used to influence voice-related activity. In case of a microphone-array used for beam forming, the reflection position can help steering the microphone reception beam towards the speaker. In another embodiment, the reflection analysis can be used to cancel room echoes.

Optionally, the reflection analysis may analyze a reflection cloud and search for relatively fast movements. Such a scenario may describe the reflection of a moving finger inside a cloud of reflections from other fingers and the hand itself. Such a case may benefit from the earlier described embodiment of base-band and carrier analysis, which allows accurate separation of near-by reflections.

Optionally, reflections from several fingers may be analyzed, allowing the positioning of more than one finger, and allowing a full finger analysis to be carried out, In this way a musical keyboard could be simulated.

Numerous examples which may benefit from the methods described above are discussed below. These examples are not comprehensive and are discussed as a way of example.

Any planar surface can allow user interaction by emitting ultrasonic energy and analyzing the reflections. Optionally, a user can move his hand on the planar surface near the device. The movements can be interpreted to control a mouse movement. Tapping a finger can be interpreted as a mouse click.

Optionally, multi-touch gestures can be implemented with the reflection analysis, allowing two or more fingers to perform gestures, say associated with functions such as zoom in, zoom out, etc.

Optionally, a 3D control can be implemented.

Optionally, the reflections can be used to help auto-focus a camera.

Optionally, the reflections can be used to 'crop' a video image.

Optionally, a reflection can be used to mute a device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will pertain. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks may be implemented by hardware, by software or by firmware or by a combination thereof using an operating system.

For example, hardware for performing selected tasks according to embodiments of the invention may be implemented as a chip or a circuit. As software, selected tasks according to embodiments of the invention may be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data.

Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art, how embodiments of the invention may be practiced.

In the drawings:

FIGS. 4A-4C are three exemplary sets of correlation curves illustrating potential ambiguity that may arise due the presence of multi-path signals according to some embodiments of the present invention;

FIGS. 8A-8D illustrate a leakage attenuation method in the time domain in which the time-domain signal is averaged during no reflection condition and then the averaged value is subtracted from the received signal when a reflection is detected or indicated;

FIGS. 11A and 11B illustrate a filtered version of FIGS. 10a and 10b.

FIGS. 13A, 13B and 13C illustrate an application of the present embodiments for detecting the positions of fingers, including gestures, for softscreen use, as a mouse and for detecting proximity;

DESCRIPTION OF SOME EXEMPLARY EMBODIMENTS

Figure 1:
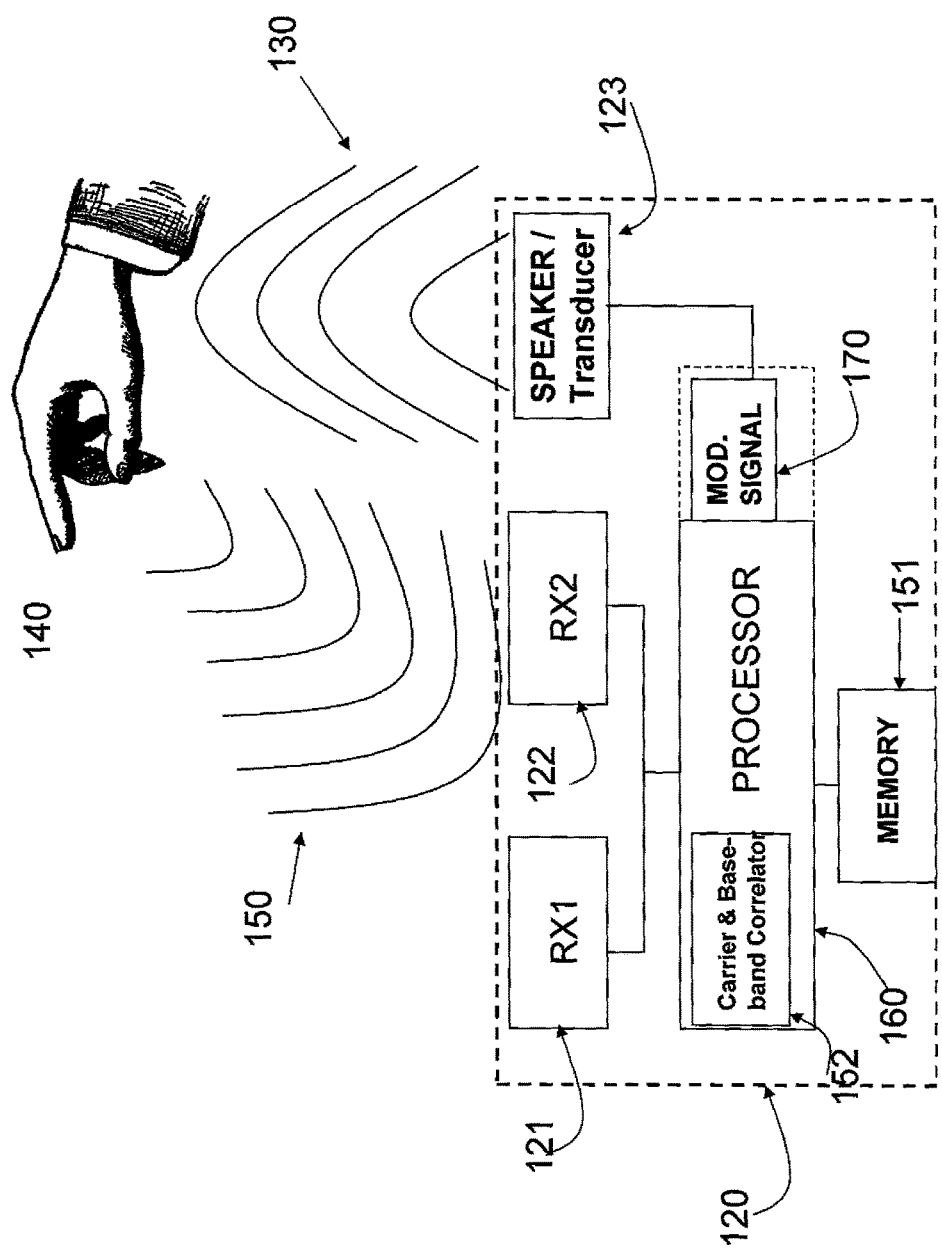
FIG. 1 is a simplified block diagram illustrating a small space positioning system according to some embodiments of the present invention.

The present invention in some embodiments thereof, relates to positioning systems and methods, and more particularly, but not exclusively to small space positioning systems and methods.

According to some embodiments of the present invention there is provided a small space positioning system. According to some embodiments of the present invention, a small space positioning system transmits a modulated continuous signal towards a passive object that reflects the transmitted signal and the reflection is detected by at least two receivers spaced apart. The modulated continuous signal includes a pre-defined base-band signal embedded on a carrier signal. TOF and/or LOS distance may be determined based on analysis of base band part and the carrier part of the signal, or using a cross-correlation calculated between an expected modulated signal and a received modulated signal. As used herein the term cross-correlation means any comparison function that can compare signals, e.g. minimum variance, minimum absolute error, etc. Optionally, the synchronization signal is transmitted together with the modulated continuous signal to define a start of the TOF delay.

According to embodiments of the present invention, cross-correlation is performed with both the carrier and base-band signal, e.g. without removing and/or performing down conversion, and with or without a low pass filter on the carrier signal. Cross-correlation of the expected and received carrier waveform may facilitate performing phase analysis of the carrier signal.

The Base-Band (BB) signal may provide positioning with an accuracy within an order of magnitude corresponding to a wavelength of the carrier signal, while phase analysis of the carrier signal may improve the accuracy by providing information regarding the position within that wavelength.

Embodiments of the present invention may facilitate improving the accuracy that may be obtained for acoustic positioning systems. Accuracy in the order of approximately one thousandth of a wavelength of the carrier signal may be achieved. Typically, the accuracy is limited by Signal to Noise Ratio (SNR); with an infinite SNR the accuracy may be infinite too. In practice, SNR may be as high as 20 dB and may still allow for very good results in terms of accuracy. The inventors have found that the limiting factor of the accuracy of the system described herein is not the SNR if it is high enough, say typically above 15 dB. The limiting factor is the repeatability of the speed of sound which varies slightly even at office/home environments. Small fluctuations in the speed of sound, say due to temperature variations, may limit the system accuracy. However direct measurement of the temperature may be made based on measuring the TOF of the signal pathway directly between the speaker and microphone, which is a known distance. Thus an embodiment of the present invention may correct for such temperature variations.

The carrier signal and BB signal may be selected so that the carrier signal falls within the frequency range of the BB signal and/or in the same order of magnitude as the BB signal.

The carrier and BB signals may be acoustic and are in the ultrasound (US) frequency range. In other exemplary embodiments, the carrier and base-band signal are electromagnetic and are in the RF range.

Embodiments may resolve ambiguity when determining the LOS distance or reflection distance in the presence of multi-path signals. Ambiguity may be due to overlapping of correlation curves, e.g. correlation curves of the original signal or closest reflection and the multi-path signals, making it difficult to identify the original LOS peak or closest reflection point of the reflecting object.

One or more parameters may be calculated to determine a most likely positioning during exposure to multi-path signals. A scoring system may be used to determine the most likely positioning, based on various defined parameters. Analysis of peaks in an envelope and a real part of the correlation may resolve ambiguity, or history tracking or velocity tracking or comparison between signals received in each of the receivers, or any combination of the above may be used to resolve ambiguity.

Reference is now made to FIG. 1 which is a simplified schematic block diagram showing a small space reflection positioning system according to embodiments of the present invention. A transmitting element at a fixed and known location is provided by speaker 123 which transmits a modulated continuous wave 130. The wave 130 comprises a continuous carrier signal part and a base-band signal modulated onto the carrier. The transmitting element 123 is positioned to transmit the modulated continuous wave over a range in which an object to be positioned may be expected to appear, such as over a screen, or on a surface in front of a computing device, as will be discussed in greater detail below. A receiving element RX1 receives signals transmitted by the transmitting device and reflected by an object 140.

A position detection element includes processor 160 and its constituent parts and accessories such as memory 151, and uses the reflection signal to determine a position of the object, typically by analysis of both the carrier signal part and the base-band signal in the reflected signal.

Positioning system 120 typically includes transmitter 123, and receivers 121 for picking up signals transmitted by the transmitter, reflected from an object 140 and received by the receivers. The system 120 estimates the position of the reflecting object within a defined space based on a TOF analysis of the received reflected signals. Typically, system 120 is stationary.

According to embodiments of the present invention, transmitting device 123 transmits a pre-defined modulated continuous signal 170. One or more receivers, e.g. receiver 121 and receiver 122 from system 120 may pick up signals transmitted by transmitter 123. The received signals are compared to an expected signal, e.g. a replica of the pre-defined modulated continuous signal that is pre-stored on the receiver end, or a calculated signal at the receiver end or an acquired signal by the receiver) using a carrier and BB correlator 152. Typically carrier and BB correlator is integral to a processing unit 160. A template, model and/or features of the pre-defined modulated continuous signal are typically pre-stored in memory 151, e.g. non-volatile memory. The template as used herein is the full model of the expected signal from the mathematical series to the digitized input data. The template represents the overall model including for example microphone response, transmitter response, circuitry, reflector, air gaps etc.

The template may be used as a starting point for a calculated reference. Different examples may differ somewhat in terms of the transfer function between the transmitter and the receiver. The receiver may for example accommodate for these differences by adjusting the template on the fly or in a special calibration mode. A quantitative measure for the quality of the received signal may be implemented for such a purpose. Such a quantitative measure may be a correlation score, and a pre-defined threshold on the correlation score may be implemented to define the quality of the signal. For example, when the correlation score is above the pre-defined threshold, the received signal may be used by the system to adjust the template.

Receivers 121 and 122 may receive one or more signals from transmitters 123. Typically the receiver 121, 122 and transmitter 123 are stationary, spaced apart, and positioned at pre-defined locations. In one exemplary embodiment, receivers 121 and 122 are positioned along the edge of a display unit associated with a computing device, e.g. a personal computer, mobile phone device, personal digital assistant (PDA). Receivers 121 and 122 may be microphones. A carrier and BB correlator 152 in electrical or logical communication with receiver 121 and receiver 122 may include circuitry to cross-correlate the received and expected modulated signal without extracting the BB signal from its carrier and/or to carry out cross correlation of the BB signal together with the carrier signal. Typically a template of the expected modulated signal may be implemented for cross-correlation with the received signal.

Synchronization of transmitters and receivers may be achieved in the present embodiment by using the same clock source for transmitters and receivers. TOF measurement includes measuring the time between the emission of the modulated signal 130 and the estimation of the most likely delay of the received signal, as explained hereinbefore.

A processor 160 determines positioning based on cross-correlation results of the carrier and base-band signal. Each system may be associated with a dedicated carrier and BB correlator 152, and the transmitter 123 may emit one of a series of possible signals. In this manner, several transmitters may transmit simultaneously from the same system, without interfering. Several systems may be used in the same vicinity, each using a different set of signals to avoid interference with other near-by systems. Optionally, before transmission, a system listens to the surrounding environment, choosing a signal dynamically in order to avoid interference.

In alternate embodiments of the present invention, carrier and BB correlator and/or its functionality is integral to a processing unit 160, e.g. in a personal computer or computing device associated with the positioning system. Processor 160 may include Fast Fourier Transform (FFT) capability and may be used to perform phase and amplitude analysis of the received signals.

Memory unit 151 may include memory capability, e.g. memory capability to store information from received signals, parameters of an expected modulated continuous signal and/or other information. Memory unit 151 may include volatile as well as non-volatile memory. Memory unit 151 may store one or more calibration parameters implemented to adjust the template based on features, e.g. transfer functions of the specific hardware sets, e.g. receivers and transmitters. Exemplary calibration parameters may include differences in phase, amplitude, and group delay of the template among other parameters.

The modulated continuous signal source 170 may be an acoustic signal source, e.g. in the ultrasound range. For example, the signal range of the modulated continuous signal source 170 may vary between around 20 and 80 KHz and/or up to 200 KHz. Although frequencies above 200 KHz may also be used for acoustic signals, the inventors have found that as the frequencies of acoustic signals are increased, so is susceptibility to loss of LOS. An increase in frequency may have an impact on overall acoustic response due to small artifacts with dimensions bigger or in the vicinity of the wavelength or on the decay rate of the transmitting signal, resulting in a smaller effective range of the system.

According to other embodiments of the present invention, signal source 112 may be an RF signal source. In some exemplary embodiments, the RF signal source may emit signals in the Ultra High Frequency (UHF) range, e.g. 433 MHz, 868 MHz, 900 MHz, 915 MHz, and 2.4 GHz and/or in the Ultra-Wideband (UWB) range, e.g. 3.1-10.6 GHz.

The distance between the transmitting/receiving system and the reflecting object may be determined based on the TOF of the modulated continuous signal from the transmitter, reflecting from an object and picked up by the receivers. The received signal may include typically the shortest path, generally the LOS, or the shortest distance between the transmitters and receivers, a group of reflections from the reflecting object, and reflections from the device itself and the environment. One receiver may be able to determine a distance to the reflecting object. Two receivers may allow a determination of a sub-space of possible reflector positions. Position of the reflecting object in three dimensions may be determined based on triangulation of the distances determined from each of the three receivers.

Based on the received signal, processor 160 calculates the TOF based on the carrier and BB signal and typically performs triangulation to determine the position of the transmitting device as a function of time.

The present inventors have found that for acoustic positioning there are advantages to using a transmitting signal in the US frequency range. US waves are at the higher end of the acoustic spectrum. Typically, higher accuracies may be obtained for higher frequency carrier signals. Another advantage is that US waves are typically less susceptible to interference from environmental noise since US transmitters are less prominent in our typical environment as compared to other acoustic transmitters and/or compared to RF transmitters. For cases when additional US transmitters and/or US signals may appear in the surrounding environment, they typically decay faster than other acoustic waves since decay rate is increased for higher frequencies. Another advantage of US positioning systems is that for a required amount of transmission energy, US transmitters and/or receivers are typically smaller than other signal transmitters and/or receivers. Additionally, since the US frequency range is not audible to humans, it is more practical for user interaction than other acoustic ranges used in acoustic positioning systems. The range of the acoustic frequencies implemented may be limited due to greater susceptibility to temporary loss of LOS for higher range signals.

Although systems and methods have been mostly described for acoustic signals ranging between 20-100 KHz, the system and methods described herein may also be applicable to medical ultrasound systems typically applying higher frequencies, e.g. 1-6 MHz for deep structures such as liver and kidneys or 7-18 MHz for structures such as muscles, tendons, testes, breast and neonatal brain. Additionally, the system and method described herein are also applicable to RF systems.

The system and method described herein may be easily adapted to multiple users, e.g. groups of users working in proximity to each other. Each transmitting device 110 may transmit a unique modulated continuous signal that may be recognized by dedicated detectors 151 and 152 (FIG. 1). The carrier signal in different transmitting devices may be modulated by a different base-band signal for different users. Each receiver and/or detector may recognize the base-band pattern corresponding to its related transmitter. For example, recognition may be enabled by signal analysis of the baseband signal.

Specifically, the usage of orthogonal BB series, or nearly orthogonal BB series, may have significant benefits. The term "nearly orthogonal" means that the cross-correlation of two different BB series may have low values in reference to each series auto-correlation.

Received signals that do not posses defined properties of the expected base-band signal may be ignored and/or excluded from TOF analysis. Since TOF is determined by both the base-band and carrier information, different signals may be implemented without sacrificing the accuracy of the detection and/or estimation of the TOF.

Figure 2:
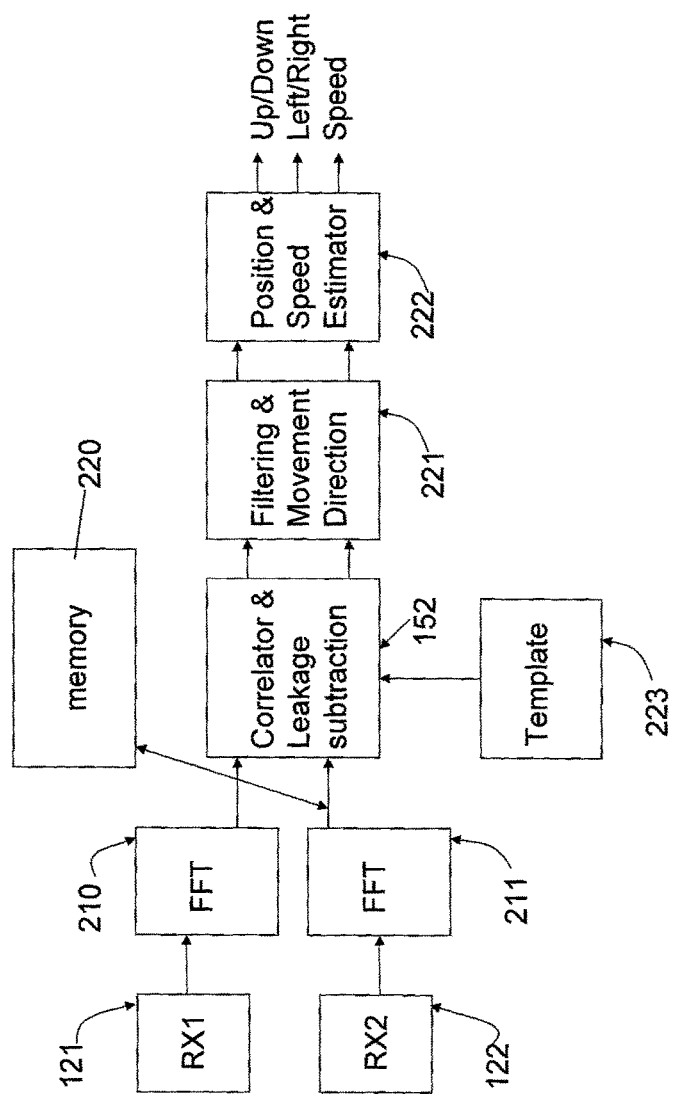
FIG. 2 is a simplified data flow diagram for determining position of the object that reflects the transmitted signal according to some embodiments of the present invention.

Reference is now made to FIG. 2 showing a simplified conceptual data flow diagram for determining the reflection position according to embodiments of the present invention. Signals picked up by two or more receivers, e.g. receiver 121 and receiver 122 may undergo FFT 210 so that delay analysis of the received signals may be performed within a pre-defined frequency band. Signals picked up by the receivers may be filtered and amplified prior to performing FFT. Timing correction of the signals received from receivers 121 and 122 is performed in the frequency domain based on a detected time shift between the received and the transmitted modulated signal. Typically, the corrected signal is saved in memory 220 for further processing so as to determine positioning. The delay between the receiving and transmitting circuits may be compensated on-the-fly by analyzing the location of the received signal. The direct path between the transmitter and receiver is dependent mainly on the geometry, i.e. the location of the transmitters and receivers, which is constant. This known distance can be used to determine the TOF for systems lacking initial synchronization between the receivers and transmitters Alternatively, the system may include a synchronization phase, where at least one receiver input and one transmitter output are electrically connected.

Memory 220 is integral to memory 151 as shown in FIG. 1. The correlator performs cross-correlation between the template stored in 223 and the input data after the timing correction. Correlator 152 may be implemented for cross-correlating an expected modulated continuous signal, e.g. a pre-determined modulated continuous signal saved in memory 223.

Correlator 152 may calculate the envelope (absolute) and real portion of the correlation curve. Then, based on the position of the envelope peak and the peak of the real portion, a TOF may be determined. Correlator 152 may take into account the leakage signal, and may attenuate, for example by subtraction, the leakage estimation from the received signal, as will be discussed in greater detail hereinbelow. The output of the attenuation operation may then be filtered and a direction of movement is estimated in filtering and movement direction block 221, as will be discussed in greater detail hereinbelow.

Information stored from previous samples, and/or output signals from the other receiver may be considered when determining TOF and/or distance of LOS. Stored data may include one or more defined parameter values, threshold values and/or other information useful in determining the TOF. Stored data may include tables, e.g. a table of the expected, pre-stored and/or reference signal.

Position of origin of the transmitted or reflected acoustic signal may be determined by coordinate and speed estimator 222 based on the TOF determined from signals received from receivers 121 and 122. Position of origin may be defined within a pre-defined coordinate system relative to the position of the receivers. The position and Speed Estimator (222) output may map certain reflection behavior over time as gestures, allowing for instance Up/Down gestures or Left/Right gestures. More precise reflection analysis allows locking on certain reflections, such as a reflection from a pointing finger, to track movement of the finger. The finger tracking may for example be used as a mouse, to control cursor movements.

Processor 160 may use a template to construct a look up table of reference and/or expected signals against which to compare received signals so that a best match distance may be found. The expected waveform may be sampled at the Nyquist rate, and any timing mismatch between the sampling points can be overcome by extrapolation functions, to reveal the distance. The skilled person will appreciate that acoustic signals have differing angular transfer functions, and an equalizer may be added to the receiver in order to compensate for this phenomenon.

The most likely signal obtained by the ambiguity detector is used to identify a most likely non-zero distance from the template signal. Coordinates estimator 222 may include a maximum likelihood detector similar to that described in incorporated International Patent Application Publication No. WO03088136.

Continuous signal 170 may be represented by a complex low pass time domain signal $s_L(t)$ having a Fourier transform $S_L(\omega)$ so that:

$$S_L(\omega)=0, |\omega|>B/2 \text{ and } S_L(\omega)\neq 0 \text{ otherwise.}$$

The autocorrelation function of this signal in the frequency domain is:

$$C_{LL}(\omega)=S_L(\omega)\cdot\overline{S_L(\omega)}=|S_L(\omega)|^2 \quad \text{Equation (1)}$$

Note that the autocorrelation function $c_{LL}(t)$ in the time domain may be symmetrical, since the frequency response is real.

The two-sided band pass signal $S_{BP}(\omega)$ may be synthesized by placing the frequency response of $S_L(\omega)$ around a carrier frequency $\omega_c$ as positive and negative frequencies.

The autocorrelation and/or cross correlation of $S_{BP}(\omega)$ may be represented as (assuming $\omega_c \geq B/2$):

$$C_{BPBP}(\omega)=S_{BP}(\omega)\cdot\overline{S_{BP}(\omega)}=\frac{1}{4}\cdot[|S_L(\omega)|^2*\delta(\omega-\omega_c)+|S_L(-\omega)|^2*\delta(\omega+\omega_c)] \quad \text{Equation (2)}$$

The time domain representation is:

$$c_{BPBP}(t)=\frac{1}{4}\cdot[c_{LL}(t)\cdot e^{j\omega_c t}+c_{LL}(-t)\cdot e^{-j\omega_c t}]=\frac{1}{2}\cdot c_{LL}(t)\cdot \cos(\omega_c \cdot t) \quad \text{Equation (3)}$$

Note that if $S_L(\omega)$ is symmetrical, $C_{LL}(t)$ will be real. Instead of using the two-sided $S_{BP}(\omega)$ signal, one-sided representation, with only positive frequencies containing information, $S_{BP+}(\omega)$ may be used.

The autocorrelation of the signal may be:

$$C_{BP+BP+}(t)=\frac{1}{2}\cdot c_{LL}(t)\cdot e^{j\omega_c t} \quad \text{Equation (4)}$$

The absolute part of $c_{B+PBP+}(t)$ corresponds to the BB signal autocorrelation, in Equation (1). The phasor (complex exponent) adds a modulation term to the response.

The real part of Equation (4) corresponds to the carrier and BB correlation $C_{BPBP}$ of Equation (3). The terms "real correlation" and "absolute correlation" are derived from Equation (4) as explained herein.

Figure 3:
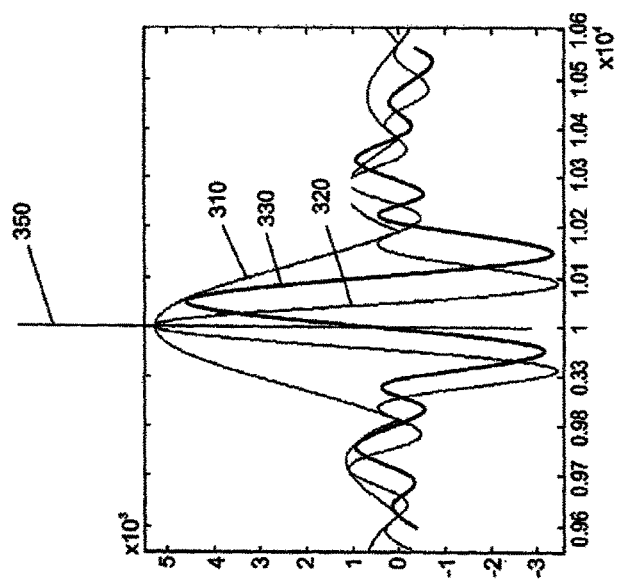
FIG. 3 is a schematic illustration of absolute, imaginary and real parts of the correlation curve of a received and expected signal according to embodiments of the present invention.

Reference is now made to FIG. 3 which is a graph of an absolute and real part of a cross-correlation curve between a received signal and an expected signal according to embodiments of the present invention. The absolute part of the correlation curve and/or the envelope curve 310 represents the base-band autocorrelation, while the real part of the correlation curve 320 represents the BB and carrier signal cross-correlation. As can be seen from FIG. 3, the correlation curve for the carrier and BB signal 320 is narrower than the correlation curve corresponding to the base-band signal 310. Correlation curve 320 provides added phase information embedded in the carrier signal. Since the correlation curve for the carrier and BB signal 320 is narrower, it allows more accurate estimation of the distance within the wavelength determined by envelope curve 310. The delay of the LOS signal may occur at time when line 350 crosses the time axis (X axis) and is defined at a time corresponding to a peak in real part of the correlation curve within the confines of the envelope curve 310. The imaginary part of the correlation curve 330 may be used to provide the added phase information embedded in the carrier signal. Both the imaginary and real parts of the correlation may be implemented to determine phase information.

Combining information from the base-band part of the correlation curve with phase information provided by the carrier enables more accurate estimation of the TOA. Typically, e.g. if the bandwidth is sufficient, the base-band signal contains information to an accuracy in the order of magnitude of the wavelength. The carrier signal has a narrower waveband and provides phase information within the wavelength defined by the envelope. The inventors have found that combining the results from the base-band and the carrier enables a more accurate estimation of distance without the ambiguity that would result in only using the correlation with the carrier.

An ideal auto-correlation result of a square BB signal may be envelope 310 that has a sinc(x) shape, and a carrier 320 whose peak is aligned with a peak of the envelope. The sinc(x) represents sin(x)/x, and is due to the finite bandwidth of the signa, the width of the sinc(x) main lobe being proportional to the bandwidth of the signal. Using correlation with the carrier signal may improve the accuracy by a factor of 10.

Improved accuracy over other systems may be achieved by considering the phase information embedded in the carrier signal when determining TOA and/or TOF. In known systems using modulated continuous signals for positioning, e.g. in RF positioning systems, the carrier signal is removed and not considered when determining TOA, TOF and/or LOS distance.

The frequency of the carrier signal, e.g. 30-60 KHz is approximately in the same order of magnitude as the bandwidth, e.g. 50-100 KHz. Since the sampling rate is typically determined based on the bandwidth, e.g. to be at least twice the bandwidth so as to avoid aliasing, the sampling frequency typically used to determine the real signal is also applicable to sample the carrier signal so that the carrier signal information may be considered without significantly increasing the sampling rate of available systems, e.g. acoustic small space positioning systems.

Typically, this is not the case for RF systems where the carrier frequency may be of an order of magnitude of a hundreds of MHz while the bandwidth may be substantially smaller. However, for known RF systems including receivers with high sampling rates, e.g. sampling rates of 3-4 GHz, and/or even higher rates, e.g. 6-8 GHz, the phase information of the carrier signal may also be applied using the system and methods described herein.

The carrier and BB signal is typically more robust than the BB signal and keeps its position with the LOS, e.g. keeps its position with the LOS in the face of multi-path signals. Due to the robust nature of the carrier signal, when determining correlation, the susceptibility of the positioning system to ambient noise is reduced as compared to systems that rely on BB signal for determining correlation.

Reference is now made to FIG. 4A-4C showing three exemplary sets of correlation curves illustrating potential ambiguity that may arise due the presence of multi-path signals according. When short range multi-path signals exist, several delayed signals arrive at the detector in close range and super-impose on each other, thereby obscuring the resultant correlation curves. When a multi-path signal exists such that its corresponding correlation curves 450 appears at a distance from the correlation curve of a line of sight (LOS) signal 400, the peak in the real and absolute portion of the correlation, indicating the maximum correlation point 410, may be clear and LOS distance may be determined (FIG. 4A). LOS is the shortest distance from which the signals was received and/or the distance between the transmitter and receiver without multi-pathing. Since, the shortest distance is represented by the first peak with delay 410, it is clear that this first peak represents the LOS signal.

However, ambiguity may result from short multi-path signals, e.g. multi-path signals from a distance in the order of magnitude of one wavelength of the carrier signal. As the multi-path delay 460 approaches the LOS delay 410 (FIGS. 4B-4C) the shape of the correlation curves may be obscured due to superimposing of the correlation curves of the LOS signal 410 and the multi-path signal 460.

Typically as shown in FIG. 4B, when close multi-pathing occurs, multiple potential LOS peaks, e.g. peaks 405 and 455 may be found in the real portion of the correlation curve leading to ambiguity as to which peak corresponds to the LOS. At first glance, the envelope curve 499 and the real curve 488 seem to point to a maximum correlation at time 460 when real curve 488 has its maximum peak 455 although the LOS peak occurs at delay 410.

When an even closer multi-path signal appears, as shown in FIG. 4C, the LOS signal and delay may be further obscured and none of the potential peaks in the real correlation curve, e.g. peaks 406, 407, and 408 may correspond to the original LOS peak corresponding to delay 410. Superposition of the signals may lead to amplification of a peak that is not the LOS peak and/or attenuation of a peak that does correspond to the LOS. Faced with ambiguity as to the LOS distance, more than one criterion may need to be examined to determine the most likely LOS peak.

The example herein discusses LOS to show the shortest distance path, but the same phenomenon may occur when several reflections super-impose on one another when reflected from a near by object. The term "LOS" can be interchanged with "shortest path of the reflection".

Figure 5:
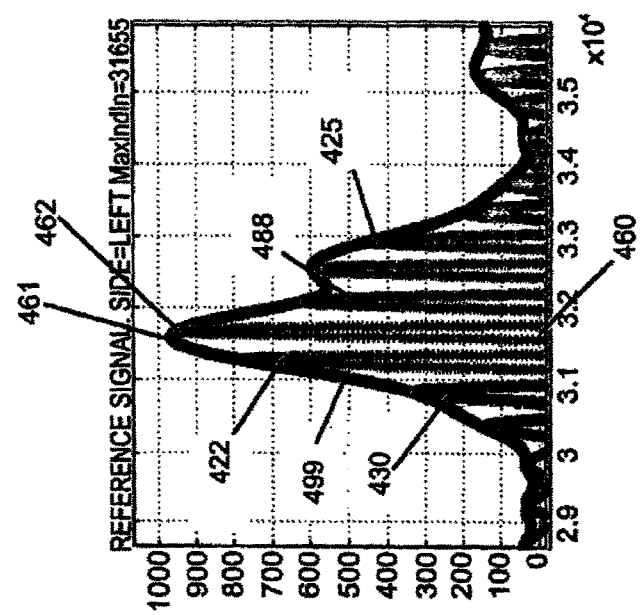
FIG. 5 is a schematic illustration of exemplary absolute and real parts of an auto-correlation curve that may be obtained from multiple multi-path signals superimposed on an LOS (Line Of Site) signal.

An ambiguity resolver may be implemented to resolve ambiguity resulting from super-positioning of multi-path signals. Reference is now made to FIG. 5 which is a schematic illustration of exemplary absolute and real parts of an auto-correlation curve that may be obtained from multiple multi-path signals superimposed on an LOS signal. At first glance, the envelope curve 499 and the real curve 488 seem to point to a maximum correlation at time 460 when real curve 488 has its maximum peak 462. One or more criteria and/or parameters may be considered and/or calculated for deciphering, estimating, and/or choosing a LOS peak, e.g. a peak corresponding to the LOS distance. The distance between envelope peak 499 and the carrier peak 462 may be considered. For example, the present inventor has found that it may be expected that the carrier peak closest to the envelope peak is the LOS peak. For example, in FIG. 5, the peak 462 may be considered as a strong candidate for the LOS peak as it is closest to envelope peak 461. Additionally, or alternatively, peaks that are beyond a pre-defined distance from the envelope peak may be dismissed as weak candidates and the LOS peak may be chosen by a process of elimination. For example, peaks 425 and 430 may be dismissed as weak candidates.

The example herein discusses LOS to show the shortest distance path, but same phenomenon may also occur when several reflections superimpose on one another when reflected from a near by object. The term "LOS" can be interchanged with "shortest path of the reflection".

Furthermore, the above-mentioned distance between the envelope peak and the carrier peak may be just one of a few parameters and/or criteria considered to estimate the most likely LOS peak. One other parameter that may be considered is whether or not the peak is located on a rising or steep rising part of the envelope. The present inventor has found that it may be expected that the LOS peak may be a peak located on the rising energy of the envelope curve, e.g. the first peak on the steepest portion of curve 420 as it is rising. For example, based on this parameter, peak 422 may be determined to be the LOS peak.

Positions and/or distances corresponding to the LOS peaks in previous samples may be considered when choosing the most likely LOS peak in a current sample. Thus, a position and/or distance corresponding to an LOS peak deciphered in previous samples where no ambiguity arose due to close multi-path, may be considered and used as a reference point when determining the most likely current LOS peak. For example, if four samples ago, it was clear that the LOS peak corresponded to a distance A from the receiver because there was no multi-path ambiguity in that sample, that sample may be used as a reference point to determine what would be the most likely distance and hence LOS peak for the current sample. History tracking the location of the LOS peak based on previous locations of the LOS peak, e.g. locations with no ambiguity, may improve the likelihood of choosing the correct LOS peak, based on the presumption that movement is continuous. Scores may be determined for different possibilities and the possibility with the best metric may be chosen as the most likely LOS peak for the current sample.

More specifically, depending on the application implemented, reasonable and/or likely ranges of velocities between sampling points may be pre-determined. Peaks that correspond to unlikely velocities outside a predefined range may be disqualified as likely LOS peaks and/or may result in low scoring. For example, in pen digitizer systems, hand motion is typically used to move the transmitting device. Possible ranges of hand motion are known and may be used to exclude unlikely positions and/or changes in position of the LOS over a defined time period. In some exemplary embodiments, LOS peaks may be given scores based on a determined velocity with respect to a previous sample. The LOS peak with the best score, e.g. with the most likely velocity, may be chosen as the most likely LOS peak. Velocity tracking may be performed between two samples, e.g. neighboring samples, and/or between pluralities of samples. In some exemplary embodiments, velocity tracking may be performed with a previous sample having no ambiguity.

Cross-correlation may also be used to detect movements, since it may show differences due to movements or additional reflections. The use of cross-correlation provides an elegant way to remove the leakage.

Information obtained from another receiver may be used to decipher the most likely LOS peak. Cross-correlation between input signals received from two receivers, e.g. receivers 121 and 122 (FIG. 1), may be performed to determine a most likely LOS peak. The present inventors have found that ambiguity due to multi-pathing does not typically affect both receivers at the same time and/or in the same manner. Each input signal may be implemented as a template for another receiver and/or received signal. When comparing results from each receiver, additional information is added and ambiguity in the position may be eliminated and/or reduced.

Any of the above parameters, as well as others, may be used alone or in combination to determine the most likely LOS peak. A scoring system may be used together with multiple parameters, each parameter contributing a score to each peak, and then the LOS peak is selected as that with the highest, or lowest, score. Weighting may be applied to each of the parameters. For example, important parameters may be given a larger weight as compared to other parameters.

Other parameters and/or additional parameters not mentioned above may be considered by the skilled person to help decipher the most likely LOS peak.

Figure 6:
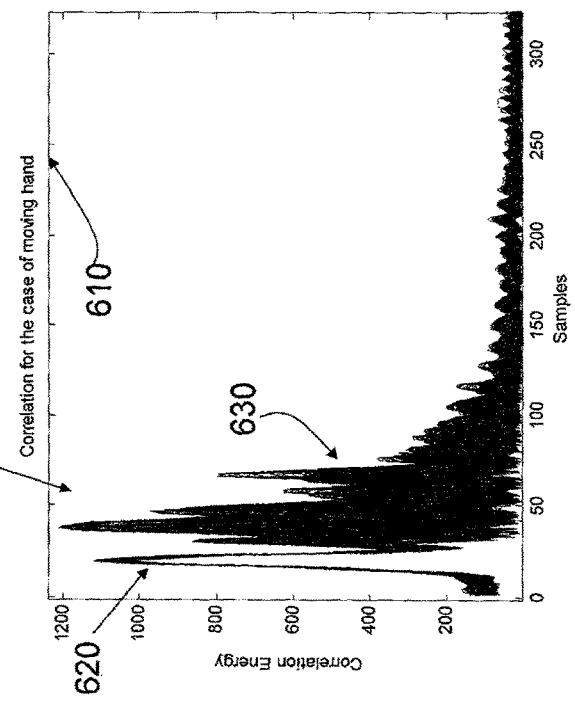
FIG. 6 is a schematic illustration of an exemplary absolute part of a cross-correlation curve that may be obtained from reception of the leakage from the direct path between the transmitter and receiver as well as reception of the reflected signal with multiple multi-path signals superimposed on an LOS signal.

Reference is now made to FIG. 6, which is a schematic illustration of an exemplary absolute part of a cross-correlation curve that may be obtained from reception of the leakage from the direct path, and surrounding fixed reflections between the transmitter and receiver as well as reception of the reflected signal, so that multiple multi-path signals are superimposed on a LOS signal. The figure shows multiple correlation curves presented in the same figure. Sample '0' corresponds to 0 distance (in a calibrated system). The 'X' axis represents time. The experiment on which the figure is based used 512 samples, while the figure shows roughly 320 samples, since the correlation values above sample 320 were generally low. The 'Y' axis represents correlation value (not normalized). The sampling rate used in the experiment was 156.25 KHz, with an emission spectrum of approximately 25 KHz to 78 KHz. However, in real life systems, a more likely sampling frequency would be 192 KHz or 96 KHz (standard audio sample rates). In some cases, sampling frequencies of 48 KHz or 44.1 KHz can be used allowing lower ultrasound bandwidth. Since the system uses the same clock source for the transmitter and receiver, there is no need to synchronize both for every transmission period. In examples using different clock sources, a synchronization mechanism may be needed. The synchronization can use the leakage identification to enable the synchronization.

The transmission signaling period determines the round-trip (transmitter-reflector-receiver) distance. A period of 1 mSec represents roughly 34 cm (since speed of sound is approximately 340 m/Sec). Usually longer periods may be used allowing more time for the reflections to decay, for avoiding inter-symbol-interference and also to allow for a longer round trip distance. As can be seen in FIG. 6, delays have significantly decayed at sample 120, corresponding to approximately 0.8 mSec round trip time. The transmitted signal can be continuously modulated without any interruptions as long as the reflection analysis is required, but may be implemented in a duty cycle of transmission and quiet regions. The silent time may permit lower power consumption and easier detection of reflected energy as well as other features.

The major part of the leakage in FIG. 6 is the closest correlation peak (620). The closest correlation peak is also relatively stable across the multiple measurements, since it represents the direct signal path from transmitter to receiver. Leakage can also represent constant reflections which depend on the setup or device casing. The elimination of such reflections is more difficult since they are dynamic so that the elimination cannot rely on measurements made in a sterile environment such as during manufacturing. For instance, if the device is placed on a table near a book or screen, the leakage may also include the static reflections of the book or the screen for the specific setup. In case the device itself has a structure that reflects part of the signal, this structure remains constant and stable so it may be regarded as leakage too.

The reflections from the dynamic environment, such as body movements, are not stable and tend to vary from one signal period to another (630). If the movements are quick, then the changes will be rapid too. In some cases, the leakage can have significant energy that may obscure the reflections and may render meaningful reflection analysis difficult. In many practical use cases, for example when the audio components (receiver and transmitter) are also used for voice functionality, the leakage attenuation is more important for getting better analysis of the reflections. The reasons for that are for instance: placement of the audio components is not optimal for ultrasound analysis but is a trade-off for voice applications, frequency response of audio-centric components tend to be lower in ultrasound etc.

Figure 7:
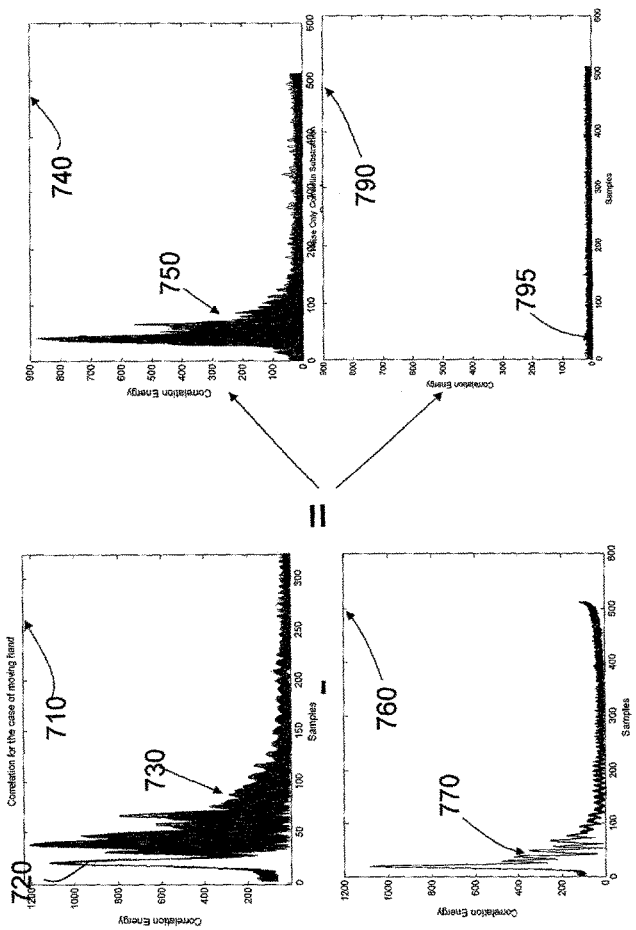
FIG. 7 illustrates the leakage attenuation method in which the absolute value of the complex correlation when no signal is detected is subtracted from the received signal.

Reference is now made to FIG. 7, which illustrates four curves of a leakage attenuation method in which the absolute value of the complex correlation when no signal is detected is subtracted from an actual received signal, that is to say leakage subtraction in the absolute correlation domain.

The leakage estimation (760) of the absolute correlation includes direct path (highest peak) and 'constant' reflections correlation following the direct path. Between them, these components form curve 770.

When the device is placed in a static environment, the subtraction of the leakage from every period of signal reception may yield a relatively low and flat correlation (795). When an object passes in the volume covered by the transmitter and receiver, the correlation may then include both leakage (720) and reflections (730). Subtracting the estimated leakage (770) from this signal yields a reflection correlation curves (750) which allows for easier decoding, showing the dynamic behavior without the static additions.

Reference is now made to FIGS. 8A-8D, which illustrate a leakage attenuation method in the time domain, or in the time and phase domain, in which the time-domain signal is averaged during no reflection condition and than the averaged value is subtracted from the received signal when a reflection is detected or indicated.

The leakage estimation (840) in the time domain includes a direct path and 'constant' or 'fixed' reflections following the main path signal. One methods for estimating this leakage is to average several signal periods in order to attenuate noise or spurious movements in the environment. The leakage is subtracted from an incoming signal (820) forming signal 860 which includes attenuated leakage. The cross-correlation of the template with the received signal without the leakage forms curve 880 which is easier to analyze for reflection behavior.

An equivalent implantation for time domain subtraction is usage of the real correlation (which includes carrier and BB information) for leakage estimation, in a similar way described for the absolute leakage subtraction.

Figure 9:
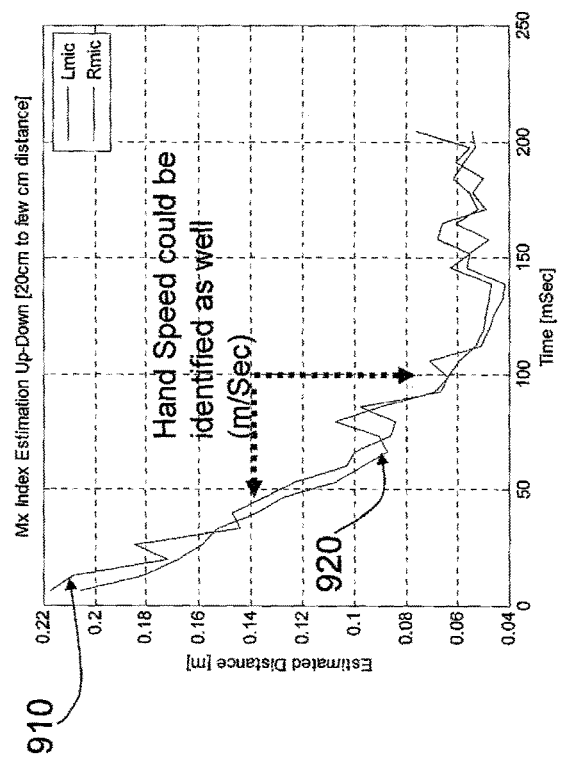
FIG. 9 illustrates an example of a TOA trajectory of to received signals from the same object during an Up/Down movement.

FIG. 9 is a graph illustrating an example of a TOA trajectory of received signals from the same object during an Up/Down movement, and showing how such an up/down movement may be detected based on reflection time of arrival.

As illustrated in FIG. 9, the position of the reflection to which the system locks on ('Y' axis) for every signal period is plotted against signal period counts ('X' axis). In this example, a hand is moved above a mock-up of a handset having a speaker and a pair of microphones facing upwardly on the handset. The round trip delay of the reflection from the hand is analyzed according to the previously described methods. Note that the curves are not entirely smooth, since some of the reflecting points on the hand become stronger or weaker, and the algorithm may choose to lock on to different reflections from different parts of the hand as time passes. However, it is easy to see that the reflection round trip delay becomes smaller, and that the two microphones have similar delays. These factors show a hand movement starting above the device and going closer ("Up/Down"). The derivative of the round trip delay is the hand speed, which can be used as well. As can be seen in the figure, the TOA trajectory of all receivers is roughly similar, or there may be a constant time shift throughout the entire trajectory. Then, the shape of the TOA trajectory is regarded as indicating an Up/Down movement if the appearance thereof is similar to an "L" shape. In an "L" shape, the beginning of the trajectory has a derivative of the TOA which is negative, this being followed by a region of the trajectory which has a constant value.

Similarly, a Down/Up movement may be identified if the shape of the TOA trajectory has a positive derivative at the beginning and than ends with a zero derivative.

The detection of the start of a movement (time 0 in the figure) uses dedicated logic. Spurious movements may be erroneously interpreted as meaningful gestures, thus limiting the usability of the solution. Such detectors may include an energy threshold which may suppress the gesture recognition until there is sufficient reflected energy. Other mechanisms may include coherent movement in a certain direction, using multiple receivers for decision etc.

A cross correlation of consecutive signals may detect the relative movement. The received signal from a previous transmission may be correlated with the subsequent signal. Such a cross correlation may show differences, since the constant, or slowly changing, reflections have minor effect. The differences may correspond to the movement. Leakage attenuation may greatly help in this method, since the changes may be emphasized. If the signal is periodic and occupies much of the signal period, a sliding window of subsequent samples may enhance the resolution of the detection. For instance, for every sample, correlation may be performed with the same length of samples but without the new sample.

A practical system may also use power modes that may allow lower average power consumption. For example, the system may look for ultrasonic reflection passing a certain threshold before entering a decoding mode which may consume more resources and use more frequent transmissions. Even the decoding mode can use variable duty cycles of transmissions, depending on the speed of the reflection. If the speed is low, the update rate of transmission/reception can be reduced as well.

Figure 10A:
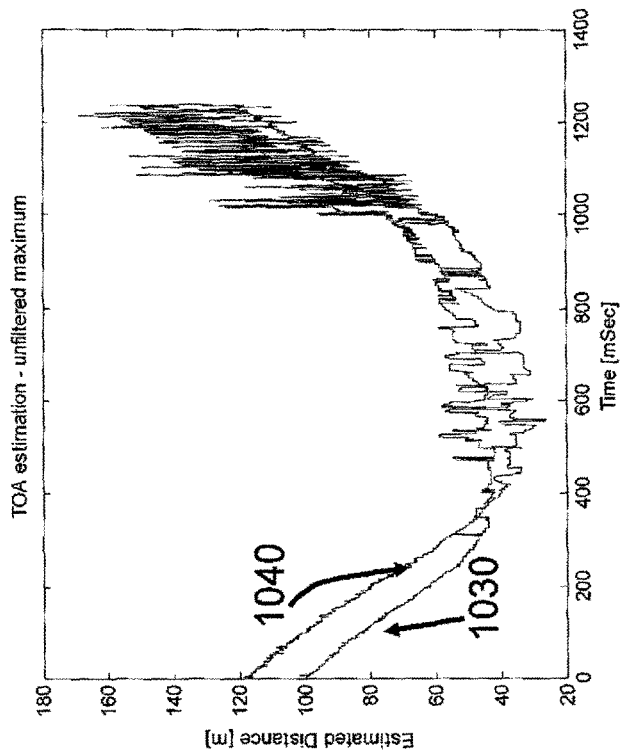
FIGS. 10A and 10B illustrate an example of the TOA trajectory of a Left To right movement of a signal received by two receivers of a signal reflected from the same object.
Figure 10B:
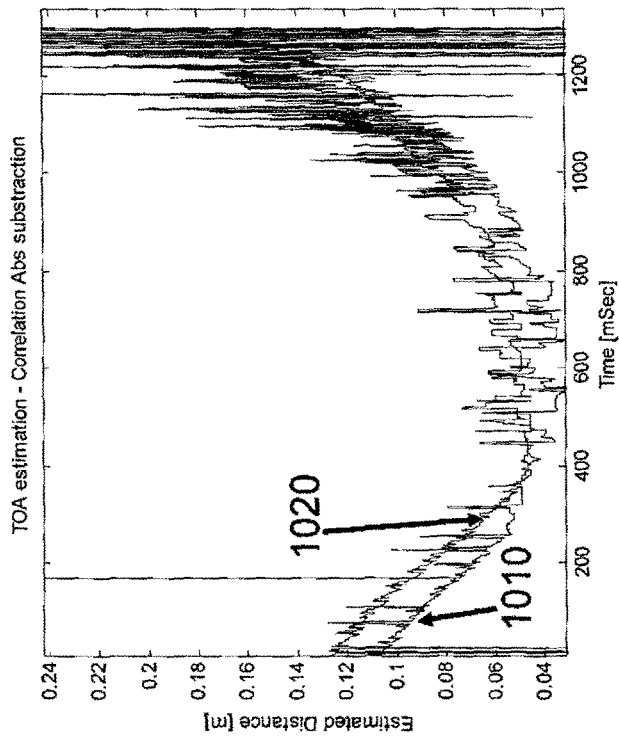

FIGS. 10A and 10B illustrate an example of the TOA trajectory of a Left to Right movement of a signal received by two receivers of a signal reflected from the same object.

As can be seen a left microphone round trip delay curve (1020) is more distant at the start (time 0) than the right microphone round trip delay curve (1010), but the order switches over time, in the case illustrated at around signal period 400. The hand movement may thus be determined to be from Right to Left.

Additionally or alternatively, the left to right or right to left movement could be extracted from the TOA trajectories of the received signals by identifying a "U" shape from both trajectories. A "U" shape derivative may be identified from a negative derivative at the beginning, followed by an approximately zero derivative, and ending with a period of a positive derivative.

Optionally, a left to right movement may be identified if the "U" shape of the trajectory at the first receiver comes before the "U" shape of the trajectory at the second receiver, in an example where the first receiver is closer to the right hand side of the system.

FIG. 10A shows leakage subtraction in the absolute correlation domain, whereas FIG. 10B shows the leakage attenuation in the time domain. It may be noted that the time domain leakage estimation provides smoother round trip estimations.

FIGS. 11A and 11B illustrate filtered versions of the trajectories in FIGS. 10A and 10B. FIG. 11A shows leakage subtraction in the absolute correlation domain and uses a median filter length of 9. FIG. 11B shows leakage subtraction in the time domain and uses a median filter length of 3 together with an all-ones filter length of 10. Different filters were benchmarked by the inventors, and the median filters as shown in the figure were found to give adequate performance with relatively low computation effort.

Figure 12A:
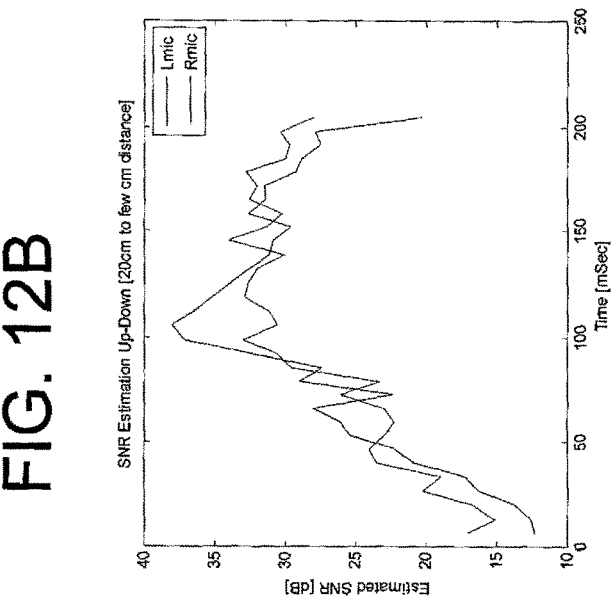
FIGS. 12A and 12B illustrate time of arrival trajectories indicating an up/down motion.
Figure 12B:
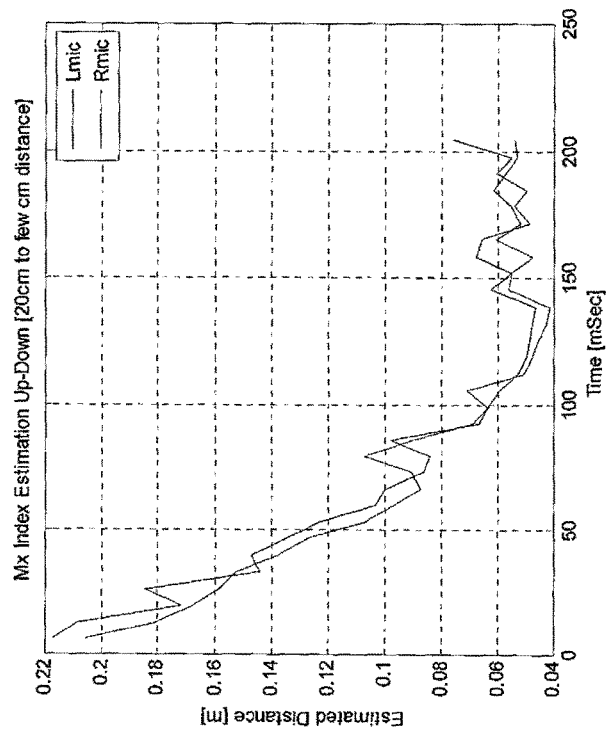

FIGS. 12A and 12B illustrate reflection power trajectories of received signals from the same object during an up/down motion.

The position of the reflection which the system lock onto ('Y' axis) for every signal period is plotted against signal period counts ('X' axis). In this example, a hand is moved above a mock-up of a handset having a speaker, and microphone pairs facing upwardly from the handset. The round trip delay of the reflection from the hand is analyzed according to the previously described methods. Note that the curves are not entirely smooth, since some of the reflecting points on the hand become stronger or weaker, and the algorithm may choose to lock on to different reflections as time passes. However, it is easy to see that the reflection round trip delay becomes smaller, and that the two microphones have similar delays. These factors show a hand movement starting above the device and going closer, thus indicating an Up/Down motion. The derivative of the round trip delay is the hand speed, which can be used as well. As can be seen in the figure, the TOA trajectory of all receivers is roughly similar, or a constant time shift may exist throughout the entire trajectory. The shape of the TOA trajectory is identified as an Up/Down motion if it is similar to an "L" shape. As discussed above an "L" shape is a trajectory wherein at the beginning of the trajectory, the derivative of the TOA is negative, and whose continuation has a constant value. Similarly, a Down/Up movement may be identified when the shape of the TOA trajectory has a positive derivative at the beginning and then ends with a zero derivative.

The detection of the start of a movement (time 0 in the figure) uses dedicated logic which is important for the movement detection. Spurious movements can be erroneously interpreted as meaningful gestures, which may limit the usability of the solution. Such detectors may include energy thresholds which may suppress the gesture recognition until there is sufficient reflected energy. Other mechanisms may look for coherent movement in a certain direction, using multiple receivers for decision etc.

In another embodiment, a cross correlation of consecutive signals may detect the relative movement. The received signal from a previous transmission can be correlated with the subsequent signal. This cross correlation will show the differences, since the constant, or slowly changing, reflections have minor effect. The differences shown up by the correlation thus correspond to the movement. Leakage attenuation may greatly help in such a method, since the changes are emphasized. If the signal is periodic and occupies much of the signal period, a sliding window of subsequent samples may enhance the detection resolution. For instance, for every sample, correlation may be performed with the same length of samples but without the new sample.

Reference is now made to FIG. 13, which shows a mobile computing or communication device 1300, emitting a modulated ultrasonic signal at speaker 1320, which is picked up by three microphones, 1340, 1360 and 1380. The device may allow for hand gesture recognition. A dedicated ultrasonic emitter can be used in order to allow higher signal levels and lower power consumption. As shown in FIG. 13A, the configuration may be used for finger tracking in the region above the screen and the same configuration may be used to enable finger touch of the screen. FIG. 13B shows an example of tracking a hand which is hovering above the screen, so that gestures made by the hand may be recognized.

As shown in FIG. 13C, a similar configuration may have a speaker 1400 and microphones 1420 and 1440 perpendicular to a table surface on which the device may be placed, allowing easy transmission and reception of waves propagating parallel to the table surface, and allowing for the use of a finger as a mouse. In the configuration of FIGS. 13A and 13B, the transmitters and receivers may have enough energy to allow for a mouse implementation even though the direction they face is up.

Figure 14:
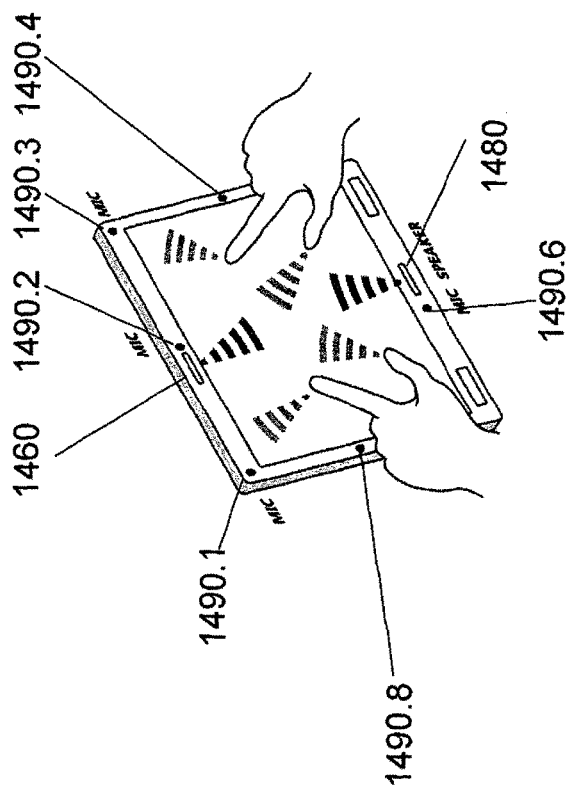
FIG. 14 illustrates an application of the present embodiments for multiple finger detection.

Reference is now made to FIG. 14, which shows a multi touch application, using multiple transmitters and receivers. In this case, two speakers 1460 and 1480 transmit signals from either side of the device and microphones 1490.1 . . . 1490.8 (not all shown) are placed at each corner and at the middle of each side. The transmitters may emit different signals as described above, which may allow for easier analysis of the reflections since it will associate specific reflections to specific emitters. Coding may be implemented to allow simultaneous transmission from several transmitters so that the receivers can discriminate the signals from the different transmitters. Orthogonal coding may facilitate the reflection analysis since the different codes may have much lower impact on each other. Using codes may also allow lower impact between near-by systems, by having different codes for every system. The code selection may be dynamic in order to lower the probability of interference between near-by systems. A system may listen for a period of time in order to detect codes used near by and then picking up a different code.

Figure 15:
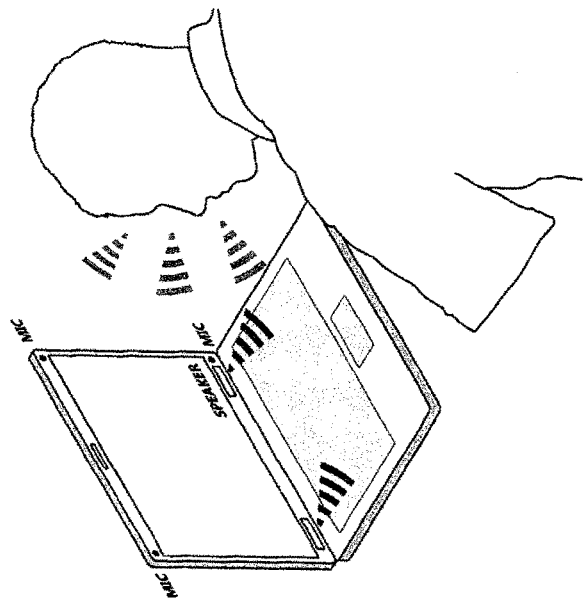
FIG. 15 illustrates an application of the present embodiments to detect the presence of a user from reflections from the user's face.

FIG. 15 shows a detector embedded in a screen or laptop to detect user presence or user movements. An application may use detection of the user's presence close to the screen to operate power management of the device, turning the device on or off as a function of user presence.

It is expected that during the life of a patent maturing from this application many relevant detecting and processing circuitries will be developed and the scope of the term detector and/or processor is intended to include all such new technologies a priori.

The terms "comprises", "comprising", "includes", "including", "having" and their conjugates mean "including but not limited to".

The term "consisting of means "including and limited to".

It is our clear intention in writing the above description that features of the invention, which are, for clarity described in the context of separate embodiments, may also be provided in combination with a single embodiment. Conversely, various features of the invention, which are, for brevity, described in the context of a single embodiment, may also be provided separately or in any suitable subcombination or as suitable in any other described embodiment of the invention. Features described in the context of various embodiments are not to be considered essential features of those embodiments, unless the embodiment is inoperative without those elements. Each feature may be taken in isolation and may then be combined with any other feature described herein, in accordance with the understanding of the person skilled in the art.

What is claimed is:

1. A system for small space positioning comprising:
a transmitting element at a fixed and known location, configured for transmitting a modulated continuous ultrasonic wave, wherein the modulated continuous ultrasonic wave comprises a continuous ultrasonic carrier signal part and a predetermined ultrasonic baseband signal modulated onto said carrier signal part, the transmitting element being configured to transmit said modulated continuous ultrasonic wave over a range in which an object to be positioned may appear;
a receiving element configured for receiving one or more signals transmitted by the transmitting element and reflected by the object, said received one or more signals comprising said modulated continuous ultrasonic wave; and
a position detection element configured to determine a position of the object from analysis of both the carrier signal part and the base-band signal in the received one or more signals, wherein the analysis of both the carrier signal part and the base-band signal includes phase analysis.

2. The system according to claim 1, wherein said position detection element is configured for performing correlation between a modulated continuous wave received by the receiving element and an expected modulated continuous wave.

3. The system according to claim 2, wherein the modulated continuous wave is pre-determined and the expected modulated continuous wave comprises a replica of the modulated continuous wave transmitted by the transmitting element.

4. The system according to claim 3, wherein said replica of the modulated continuous wave comprises a channel model for modeling passage of said modulated continuous ultrasonic wave from said transmitting element to said position detection element, thereby to provide a reference signal against which to identify a most likely distance between said transmitting element and said receiving element.

5. The system according to claim 2, wherein the position detection element is further configured for determining base-band and carrier signal correlation curves from the correlation between the received modulated continuous wave and the expected modulated continuous wave.

6. The system according to claim 5, wherein the baseband and carrier signal correlation curves comprise respective absolute, real, and imaginary curves, and said position detection element is further configured for determining at least one peak in a respective absolute correlation curve and at least one peak in a respective real correlation curve.

7. The system according to claim 1, further configured to use one member of a group consisting of: a known distance between said transmitting element and said receiving element and a fixed link, for mutual synchronization.

8. The system according to claim 1, wherein said position detection element is further configured to remove leakage of a direct signal path and leakage of static artifacts using differential detection.

9. The system according to claim 8, wherein said differential detection comprises subtracting each input sample from a preceding sample and then applying at least one member of a group consisting of complex correlation and cross correlation between successive frames, said differential detection being carried out to determine a Time Of Arrival of a reflected signal in the received one or more signals.

10. The system according to claim 1, wherein said position detection element is further configured to remove leakage of a direct signal path using complex correlation subtraction.

11. The system according to claim 10, wherein said position detection element is further configured to:
determine a first time at which there is no object placed in a detection area, calculate and average at said first time a complex correlation and save an absolute value of said complex correlation;
at a second time, when the object to be positioned is placed in said detection area, determine a second absolute value of a correlation result obtained at said second time and subtract said second absolute value from the saved absolute value, thereby to extract an absolute correlation of a reflected signal in the received one or more signals without said leakage of said direct signal path; and
use said absolute correlation to extract a Time-Of-Arrival of the reflected signal in the received one or more signals.

12. The system according to claim 1, wherein said position detection element is further configured to remove leakage of a direct signal path using time-domain subtraction.

13. The system according to claim 12, wherein said position detection element is further configured to:
determine a first time at which there is no object placed in a detection area, average and save the received one or more signals for a period on N frames, wherein each frame is a duration of a transmitted sequence;
at a second time, when the object to be positioned is placed in said detection area, subtract time-domain values of the received one or more signals from the saved average of the received one or more signals determined at said first time, thereby extracting time-domain values of the received one or more signals without the leakage of the direct signal path; and
carry out a complex correlation to extract a Time-Of-Arrival of a reflected signal in the received one or more signals.

14. The system according to claim 8, wherein said position detection element is further configured to use a time of arrival of said leakage of the direct signal path and leakage of the static artifacts with a known distance between said transmitting element and said receiving element, to calculate therefrom an air temperature.

15. The system according to claim 10, wherein the position detection element is further configured to determine an indication of a presence of the object by detecting change in at least one member of a group consisting of energy and Signal-To-Noise ratio.

16. The system according to claim 15, wherein detecting the change in the energy comprises correlating an input signal with a known template and then integrating an energy of a correlation output over all possible times and distances.

17. The system according to claim 15, wherein detecting the change in the Signal-to-Noise ratio comprises integrating an energy of all possible values of a correlation in a possible distance range and dividing by an average of a noise estimation at a correlation output at a distant time-shift.

18. The system according to claim 1, wherein said position detection element is further configured to calculate a Time-Of-Arrival trajectory for a reflected signal in the received one or more signals from a complex-correlation value calculated per frame, wherein said frame equals a duration of a transmitted sequence or a template.

19. The system according to claim 18, wherein said Time-Of-Arrival trajectory is calculated using a maximum of an absolute value of the complex correlation that has passed a set threshold.

20. The system according to claim 19, wherein said set threshold is set to be M times or M bigger than an average value of a noisy correlation wherein M is a predetermined constant.

21. The system according to claim 1, wherein said position detection element is further configured to use a two dimensional search for fine tuning extraction of a first path Time-Of-Arrival.

22. The system according to claim 21, wherein said two dimensional search comprises searching for multiple reflections of a same originating signal, said multiple reflections being characterized in terms of at least one of a respective time, amplitude, and phase of a corresponding complex correlation.

23. The system according to claim 18, wherein said position detection element is further configured to extract said Time-Of-Arrival trajectory from said complex correlation by taking an absolute value of a correlation above a preset threshold and integrating using a Center of Mass equation.

24. The system according to claim 18, wherein said position detection element is further configured to filter the Time-Of-Arrival trajectory using one member of the group consisting of a linear filter, an IIR filter, an FIR filter, a non linear filter, a Median filter, and a combination of a linear and a non-linear filter.

25. The system according to claim 1, wherein said position detection element is further configured to use a second receiving element and compare Time-Of-Arrival traces from the receiving element and the second receiving element.

26. The system according to claim 25, wherein said position detection element is further configured to extract a trace direction from each of the receiving element and the second receiving element, respectively, thereby to distinguish between an Up-To-Down movement and a Down-To-Up movement.

27. The system according to claim 26, wherein to distinguish between the Up-To-Down movement and the Down-To-Up movement, the position detection element is further configured to:
estimate a first derivative of each of the Time-Of-Arrival traces;
average the first derivatives and compare them to zero; and if the averaged first derivatives is greater than zero then determine that a direction of movement is Down To Up, and if the averaged first derivatives is lower than zero, then determine that the direction of movement is Up To Down.

28. The system according to claim 27, wherein said determining is made to exclude a trace part wherein the averaged first derivatives equals zero.

29. The system according to claim 26, wherein the position detection element is further configured to extract a velocity by averaging a first derivative of each of the Time-Of-Arrival traces.

30. The system according to claim 25, wherein said position detection element is further configured to use respective Time-Of-Arrival trajectories at the receiving element and the second receiving element, respectively, to distinguish between Left-To-Right and Right-To-Left movement.

31. The system according to claim 30, wherein said distinguishing comprises finding a three part formation of a decrease followed by a constant followed by an increase in the Time-of-Arrival trajectories.

32. The system according to claim 31, wherein said distinguishing further comprises comparing said three part formation separately for the receiving element and the second receiving element.

33. The system according to claim 1, wherein said transmitting element is further configured to use orthogonal encoding to provide the modulated continuous ultrasonic wave which is distinguishable from another modulated continuous ultrasonic wave transmitted by at least one other transmitting element.

34. The system according to claim 1, wherein said transmitting element is provided using an existing speaker element of said system and wherein said receiving element is provided using an existing microphone element of said system.

35. A system for small space positioning comprising:
a transmitting element at a first fixed and known location, configured for transmitting a modulated ultrasonic continuous wave, wherein the modulated ultrasonic continuous wave comprises a continuous ultrasonic carrier signal part and a predetermined ultrasonic base-band signal modulated onto said continuous ultrasonic carrier signal part, the transmitting element being configured to transmit said modulated ultrasonic continuous wave over a range in which an object to be positioned may appear; and
a receiving element at a second fixed and known location configured for receiving one or more signals transmitted by the transmitting element and reflected by the object, each of said received one or more signals comprising said modulated continuous ultrasonic wave, the receiving element comprising a position detection element configured to determine a position of the object from analysis of the received one or more signals, wherein the analysis includes phase analysis.

36. The system according to claim 35, wherein said position detection element is further configured to remove leakage of a direct signal path using differential detection.

37. The system according to claim 36, wherein said differential detection comprises subtracting each input sample from a preceding sample and then applying complex correlation to determine a Time-Of-Arrival of a reflected signal in the received one or more signals.

38. The system according to claim 35, wherein said position detection element is further configured to remove leakage of a direct signal path using complex correlation subtraction.

39. The system according to claim 38, wherein said position detection element is further configured to:
determine a first time at which there is no object placed in a receiving area, calculate and average at said first time a complex correlation, and save an absolute value of said complex correlation;
at a second time, when the object to be positioned is placed in said receiving area, determine a second absolute value of a correlation result obtained at said second time and subtract said second absolute value from the saved absolute value, thereby to extract an absolute correlation of a reflected signal in the received one or more signals without said leakage of said direct signal path; and
use said absolute correlation to extract a Time-Of-Arrival of the reflected signal.

40. The system according to claim 35, wherein said position detection element is further configured to remove leakage of a direct signal path using time-domain subtraction.

41. The system according to claim 40, wherein said position detection element is further configured to:
determine a first time at which there is no object placed in a receiving area and average and save the received one or more signals for a period on N frames, wherein each frame is a duration of a transmitted sequence;
at a second time, when the object to be positioned is placed in said receiving area, subtracting time-domain values of the received one or more signals from the saved average of the one or more signals calculated at said first time, thereby extracting time-domain values of a reflected signal in the received one or more signals without the leakage of the direct signal path; and
carry out a complex correlation to extract a Time-Of-Arrival of the reflected signal.

42. The system according to claim 35, when used for one member of a group of applications consisting of: object presence detection, cursor manipulation, multiple object tracking, a musical keyboard, and tracking interaction with a soft screen.

43. A system for small space positioning comprising:
at least three transmission elements each configured to emit modulated continuous ultrasonic waveforms; and
a central controller for providing a controlled delay between signals at each transmission element to provide ultrasonic beam steering to receive reflections from a desired direction, thereby to provide three-dimensional positioning around said transmission elements, said signals comprising said modulated continuous ultrasonic waveforms.

44. A method for small space positioning comprising:
transmitting, using a transmitting device, a modulated ultrasonic continuous wave from a fixed location, wherein the modulated ultrasonic continuous wave comprises a continuous ultrasonic carrier signal part and a predetermined ultrasonic base-band signal modulated onto said carrier signal part, said transmitting being into a range in which an object to be positioned may appear;
receiving one or more signals transmitted by the transmitting device and reflected by the object, said received one or more signals comprising said modulated continuous ultrasonic wave; and determining a position of the object from analysis of both the carrier signal part and the base-band signal reflected from the object, wherein the analysis of both the carrier signal part and the base-band signal includes phase analysis.

45. A method for small space positioning comprising:

transmitting, using a transmitting device, a modulated continuous ultrasonic wave from a first fixed location, wherein the modulated continuous ultrasonic wave comprises a continuous ultrasonic carrier signal part and a predetermined ultrasonic base-band signal modulated onto said carrier signal part, said transmitting being into a range in which an object to be positioned may appear;

receiving, at a second fixed location, signals, transmitted by the transmitting device and reflected by the object, said received signals comprising said modulated continuous ultrasonic wave; and determining a position of the object from analysis of the signals, wherein the analysis includes phase analysis.

* * * * *